(12) United States Patent
Yamauchi et al.

(10) Patent No.: US 7,082,257 B2
(45) Date of Patent: Jul. 25, 2006

(54) OPTICAL DISC STORING BOTH VIDEO TITLES PROVIDED WITH AV FUNCTIONS AND VIDEO TITLES WITH NO SUCH FUNCTIONS WHICH CAN INSTANTLY DISTINGUISH BETWEEN SUCH KINDS OF TITLES, AND A REPRODUCTION APPARATUS AND REPRODUCTION METHOD FOR SUCH DISC

(75) Inventors: Kazuhiko Yamauchi, Neyagawa (JP); Shinichi Saeki, Osaka-fu (JP); Katsuhiko Miwa, Osaka (JP); Masayuki Kozuka, Neyagawa (JP); Kaoru Murase, Nara-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 616 days.

(21) Appl. No.: 09/932,915

(22) Filed: Aug. 20, 2001

(65) Prior Publication Data

US 2001/0053280 A1    Dec. 20, 2001

Related U.S. Application Data

(60) Division of application No. 09/102,697, filed on Jun. 22, 1998, now Pat. No. 6,336,002, which is a continuation of application No. 08/837,271, filed on Apr. 11, 1997, now Pat. No. 5,771,334.

(30) Foreign Application Priority Data

Apr. 12, 1996    (JP)    ................... 8-090891

(51) Int. Cl.
   *H04N 5/91*    (2006.01)

(52) U.S. Cl. ........................................ 386/95; 386/126
(58) Field of Classification Search ................ 386/46, 386/95, 98, 96, 125, 126; 369/275.3
   See application file for complete search history.

(56) References Cited

U.S. PATENT DOCUMENTS 4,873,585 A    10/1989    Blanton et al.

(Continued)

FOREIGN PATENT DOCUMENTS

EP    542377    5/1993

(Continued)

OTHER PUBLICATIONS

"Re-inventing The Disc," by D. J. Parker, CD-ROM Profession, Jun. 1995, vol. 8, No. 6.

(Continued)

*Primary Examiner*—Huy Nguyen

(57) ABSTRACT

An optical disc on which a variety of types of video titles are recorded and which enables a reproduction apparatus to instantly distinguish whether emulated AV functions may be performed for any of the titles. The optical disc includes a manager area which stores playback type information corresponding to the management information for each video title, with the playback type information including a first flag showing whether the present video title is expressed using one or a plurality of sets of route information and a second flag showing whether a title is expressed using any branch information.

11 Claims, 31 Drawing Sheets

VIDEO MANAGER INTERNAL TITLE SEARCH POINTER TABLE a141    TITLE PLAYBACK TYPE a142    a143

| | SEQUENTIAL SINGLE PGC IDENTIFICATION FLAG | NO BRANCH FLAG | NO BRANCH BETWEEN TITLES FLAG | TITLE SET NUMBER | VTS INTERNAL TITLE NUMBER |
|---|---|---|---|---|---|
| TITLE SEARCH POINTER # 1 | ON | ON | ON | TitleSet# 1 | Title# 1 |
| TITLE SEARCH POINTER # 2 | OFF | OFF | ON | TitleSet# 1 | Title# 2 |
| TITLE SEARCH POINTER # 3 | OFF | OFF | ON | TitleSet# 1 | Title# 3 |
| TITLE SEARCH POINTER # 4 | OFF | OFF | OFF | TitleSet# 1 | Title# 4 |
| TITLE SEARCH POINTER # 5 | OFF | OFF | ON | TitleSet# 1 | Title# 5 |
| TITLE SEARCH POINTER # 6 | OFF | OFF | OFF | TitleSet# 1 | Title# 6 |
| TITLE SEARCH POINTER # 7 | OFF | OFF | ON | TitleSet# 2 | Title# 1 |
| TITLE SEARCH POINTER # 8 | OFF | OFF | ON | TitleSet# 2 | Title# 2 |
| TITLE SEARCH POINTER # 9 | OFF | OFF | ON | TitleSet# 2 | Title# 3 |

| FUNCTION | PERMISSION CONDITION | | |
|---|---|---|---|
| | SEQUENTIAL SINGLE PGC FLAG | NO BRANCH FLAG | NO BRANCH BETWEEN TITLES FLAG |
| CHAPTER NUMBER DISPLAY | ON | ON | — |
| REPRODUCTION PROGRESSION TIME DISPLAY | ON | ON | — |
| CHAPTER NUMBER SEARCH | ON | ON | — |
| TIME SEARCH | ON | ON | — |
| CHAPTER PROGRAMMING FUNCTION | ON | ON | — |
| TITLE PROGRAMMING FUNCTION | ON | — | ON |

U.S. PATENT DOCUMENTS

| | | |
|---|---|---|
| 4,953,035 A | 8/1990 | Yoshio |
| 5,400,077 A | 3/1995 | Cookson et al. |
| 5,546,365 A | 8/1996 | Roth |
| 5,613,109 A | 3/1997 | Yamauchi et al. |
| 5,636,200 A * | 6/1997 | Taira et al. .............. 369/275.3 |
| 5,771,334 A * | 6/1998 | Yamauchi et al. ............ 386/95 |
| 5,915,067 A * | 6/1999 | Nonomura et al. ........... 386/70 |
| 6,016,381 A | 1/2000 | Taira et al. |
| 6,167,189 A * | 12/2000 | Taira et al. .................... 386/95 |
| 6,336,002 B1 * | 1/2002 | Yamauchi et al. ............ 386/95 |

FOREIGN PATENT DOCUMENTS

| | | |
|---|---|---|
| EP | 644692 | 3/1995 |
| EP | 651392 | 5/1995 |
| EP | 677961 | 10/1995 |
| EP | 685845 | 12/1995 |
| EP | 724264 | 7/1996 |
| EP | 737980 | 10/1996 |
| EP | 750304 | 12/1996 |
| EP | 795869 | 9/1997 |
| JP | 7334939 | 12/1995 |
| JP | 8273304 | 10/1996 |
| WO | 9512179 | 5/1995 |
| WO | 9706531 | 2/1997 |
| WO | 9707510 | 2/1997 |

OTHER PUBLICATIONS

"DVD: Geschäft läßt warten," by R. Bücken, Radio, Fernsehen Electronik, vol. 45, No. 11, Nov. 1996.

* cited by examiner

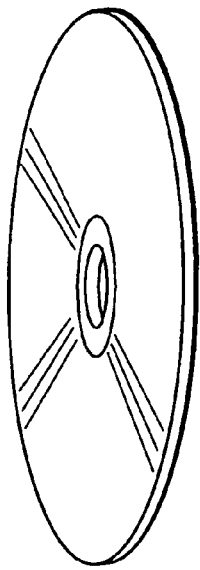
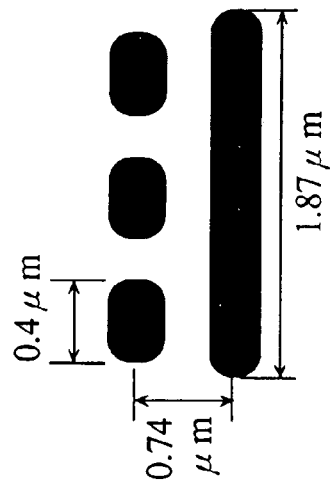
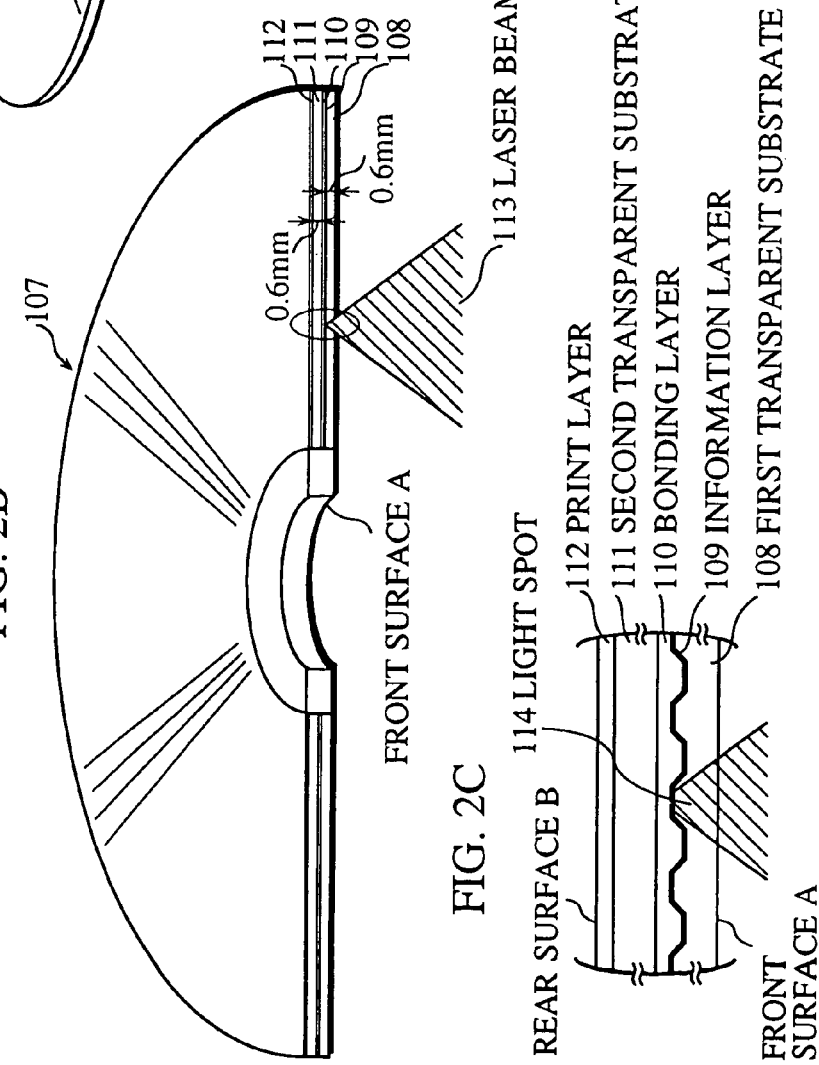

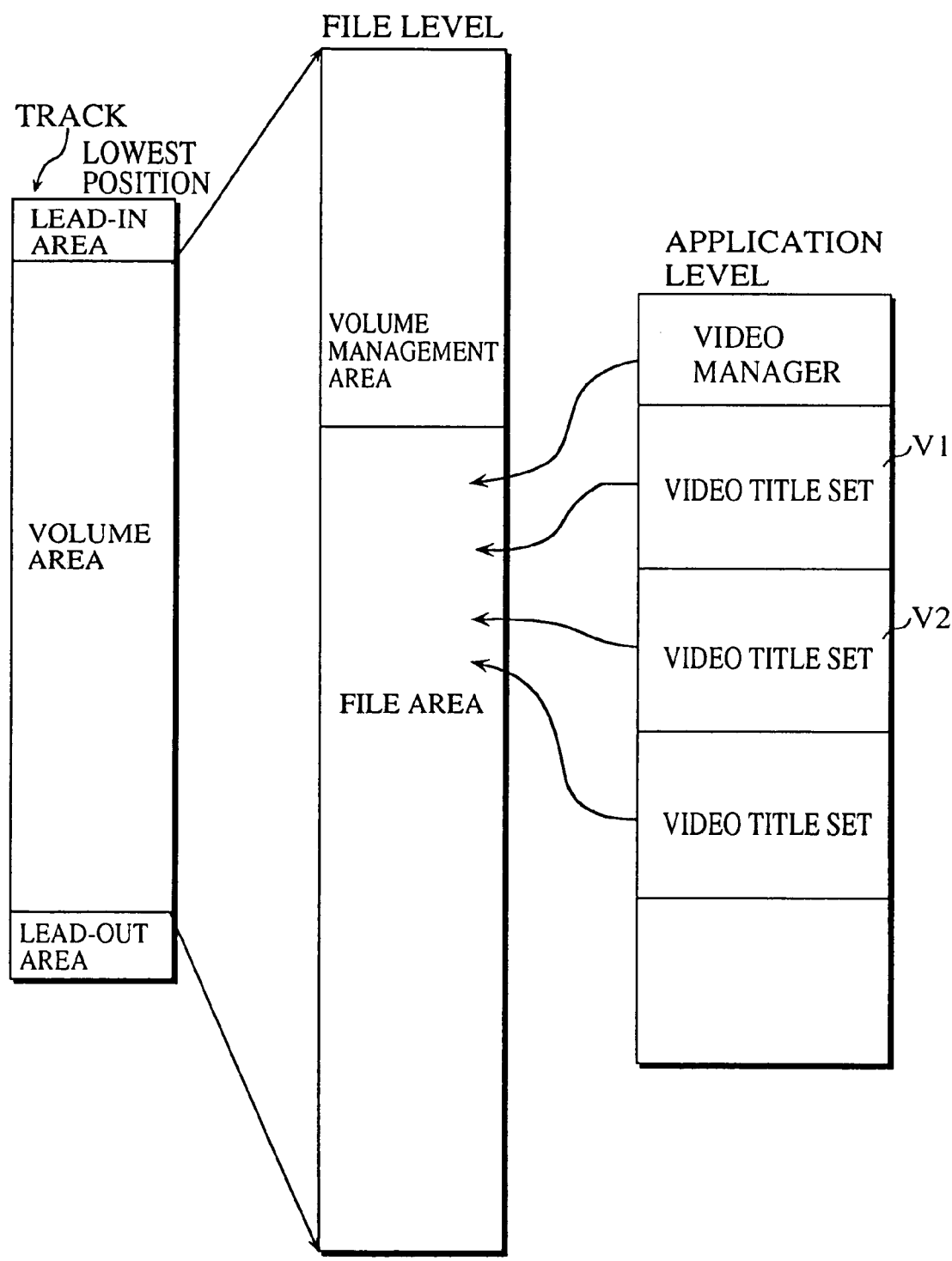

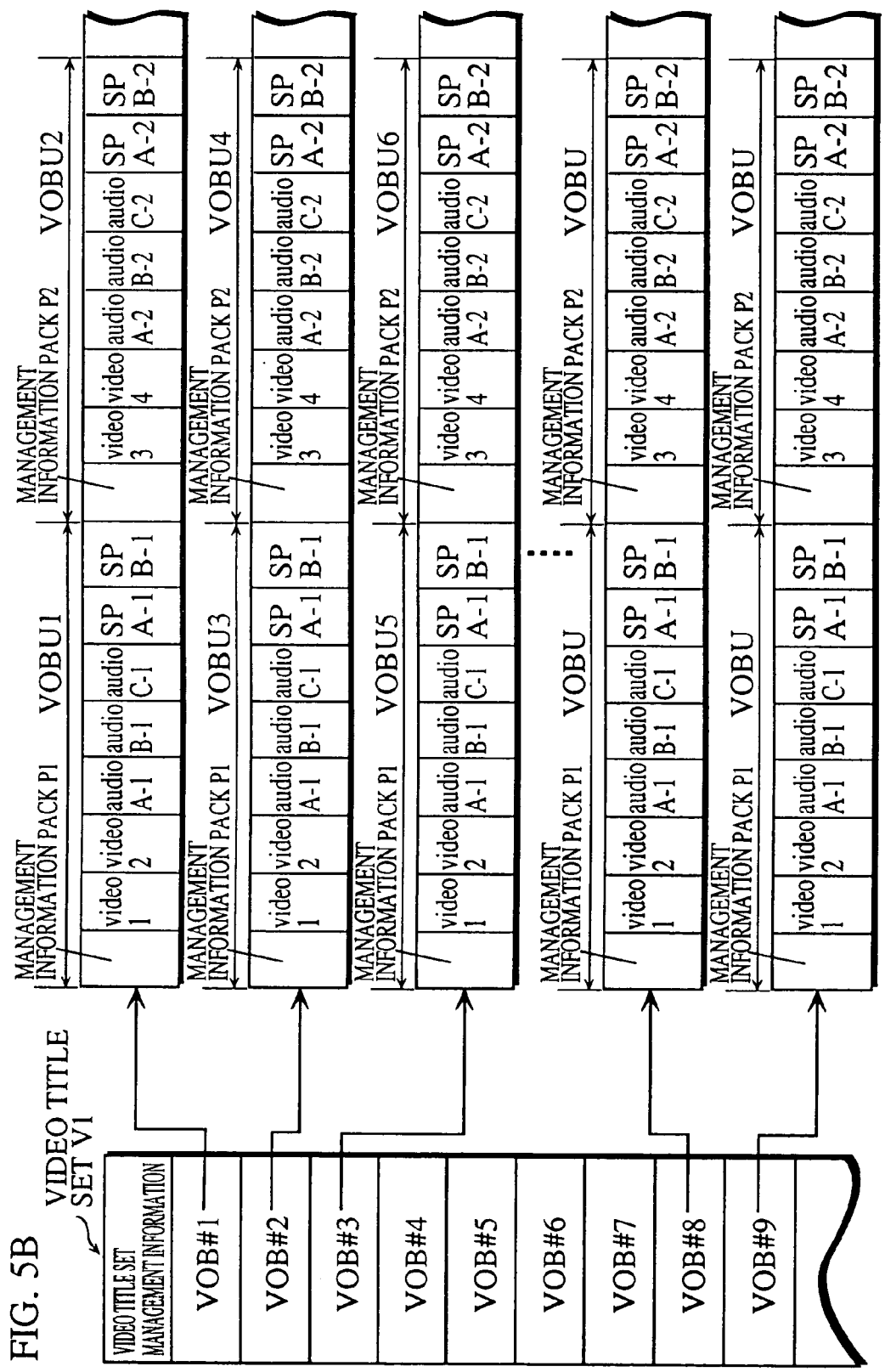

FIG. 9

VIDEO TITLE SET INTERNAL TITLE SEARCH POINTER TABLE

| VTS INTERNAL TITLE SEARCH POINTER #1 | VTS#1.VTS INTERNAL TITLE #1 | ··· Entry–PGC#1 |
|---|---|---|
| VTS INTERNAL TITLE SEARCH POINTER #2 | VTS#1.VTS INTERNAL TITLE #2 | ··· Entry–PGC#2 |
| VTS INTERNAL TITLE SEARCH POINTER #3 | VTS#1.VTS INTERNAL TITLE #3 | ··· Entry–PGC#3 |
| VTS INTERNAL TITLE SEARCH POINTER #4 | VTS#1.VTS INTERNAL TITLE #4 | ··· Entry–PGC#4 |
| VTS INTERNAL TITLE SEARCH POINTER #5 | VTS#1.VTS INTERNAL TITLE #5 | ··· Entry–PGC#5 |
| VTS INTERNAL TITLE SEARCH POINTER #6 | VTS#1.VTS INTERNAL TITLE #6 | ··· Entry–PGC#6 |

FIG. 10A

| |
|---|
| PGC INFORMATION #1 |
|   PGC LINK INFORMATION  NULL |
|   PGC STANDARD INFORMATION  NULL |
|   PG MAP |
|       PG1(VOB#1)  PG2(VOB#3)  PG3(VOB#4) |
|   VOB POSITION INFORMATION TABLE |
|     VOB#1(10min.)  VOB#2(50sec.)  VOB#3(8min.)  VOB#4(48sec.)··· |
|     VOB#21(10min.)  VOB#22(50sec.)  VOB#23(8min.)  VOB#24(48sec.)··· |
|     VOB#31(10min.)  VOB#32(50sec.)  VOB#33(8min.)  VOB#34(48sec.) |
|   PGC COMMAND TABLE  NULL |
| PGC INFORMATION #2 |
|   PGC LINK INFORMATION  PGC#13 |
|   PGC STANDARD INFORMATION  NULL |
|   PG MAP  NULL |
|   VOB POSITION INFORMATION TABLE |
|     VOB#1(10min.)  VOB#2(5min.)  VOB#3(8min.) |
|   PGC COMMAND TABLE  NULL |
| PGC INFORMATION #3 |
|   PGC LINK INFORMATION  NULL |
|   PGC STANDARD INFORMATION  5Loop Random |
|   PG MAP  NULL |
|   VOB POSITION INFORMATION TABLE |
|     VOB#1(10min.)  VOB#62(5min.)  VOB#3(30sec.)  VOB#64(8min.)··· |
|     VOB#5(18min.)  VOB#72(5min.)  VOB#4(30sec.)  VOB#74(8min.)··· |
|   PGC COMMAND TABLE  NULL |
| PGC INFORMATION #4 |
|   PGC LINK INFORMATION  NULL |
|   PGC STANDARD INFORMATION  3Loop |
|   PG MAP  NULL |
|   VOB POSITION INFORMATION TABLE |
|     VOB#1(10min.)  VOB#51(5min.)  VOB#2(30sec.)  VOB#52(8min.)··· |
|     VOB#5(18min.)  VOB#55(5min.)  VOB#6(30sec.)  VOB#56(8min.) |
|   PGC COMMAND TABLE  NULL |
| PGC INFORMATION #5 |
|   PGC LINK INFORMATION  NULL |
|   PGC STANDARD INFORMATION  NULL |
|   PG MAP  NULL |
|   VOB POSITION INFORMATION TABLE |
|     VOB#6(10min.)  VOB#8(5min.)  VOB#16(8min.)  VOB#15(5min.)  VOB#16(8min.) |
|   PGC COMMAND TABLE            CmpRegLink R1,3, "=" ,PGC#15 |
|                                       CmpRegLink R1,4, "=" ,PGC#16 |
| PGC INFORMATION #6 |
|   PGC LINK INFORMATION  NULL |
|   PGC STANDARD INFORMATION  NULL |
|   PGC MAP  NULL |
|   VOB POSITION INFORMATION TABLE |
|     VOB#17(50sec.)  VOB#18(5min.)  VOB#19(8min.) |
|   PGC COMMAND TABLE  TitlePlay Title#5 | a10

FIG. 10B

PGC INFORMATION

| PGC LINK INFORMATION |
|---|
| PGC STANDARD INFORMATION |
| PG MAP |
| VOB POSITION INFORMATION TABLE |
| PGC COMMAND TABLE |

FIG. 10C

VOB POSITION INFORMATION TABLE

| REPRODUCTION TIME OF VOB #1 | OFFSET FOR VOB #1 | NO. OF BLOCKS FORMING VOB #1 |
| REPRODUCTION TIME OF VOB #2 | OFFSET FOR VOB #2 | NO. OF BLOCKS FORMING VOB #2 |
| REPRODUCTION TIME OF VOB #3 | OFFSET FOR VOB #3 | NO. OF BLOCKS FORMING VOB #3 |
| REPRODUCTION TIME OF VOB #4 | OFFSET FOR VOB #4 | NO. OF BLOCKS FORMING VOB #4 |
| REPRODUCTION TIME OF VOB #5 | OFFSET FOR VOB #5 | NO. OF BLOCKS FORMING VOB #5 |
| REPRODUCTION TIME OF VOB #6 | OFFSET FOR VOB #6 | NO. OF BLOCKS FORMING VOB #6 |
| REPRODUCTION TIME OF VOB #7 | OFFSET FOR VOB #7 | NO. OF BLOCKS FORMING VOB #7 |
| REPRODUCTION TIME OF VOB #8 | OFFSET FOR VOB #8 | NO. OF BLOCKS FORMING VOB #8 |
| ... | ... | ... |

FIG. 11

(Video_Manager)

| |
|---|
| VM MANAGEMENT TABLE |
| VM INTERNAL TITLE SEARCH POINTER TABLE |
|   NO. OF TITLE SEARCH POINTERS |
| VM INTERNAL TITLE SEARCH POINTER #1 |
| VM INTERNAL TITLE SEARCH POINTER #2 |
| VM INTERNAL TITLE SEARCH POINTER #3 |
| VM INTERNAL TITLE SEARCH POINTER #4 |
| VM INTERNAL TITLE SEARCH POINTER #5 |
| VM INTERNAL TITLE SEARCH POINTER #6 |
| VM INTERNAL TITLE SEARCH POINTER #7 |
| VM INTERNAL TITLE SEARCH POINTER #8 |
| ⋮ |
| VM INTERNAL TITLE SEARCH POINTER #98 |
| VM INTERNAL TITLE SEARCH POINTER #99 |
| PGC INFORMATION #1_For_Menu |
|   PGC LINK INFORMATION   PGC#1 |
|   PGC STANDARD INFORMATION   NULL |
|   PG MAP     NULL |
|   VOB POSITION INFORMATION TABLE VOB#1_For_Menu |
|   PGC COMMAND TABLE   NULL |
| VOB#1_For_Menu |
|   MANAGEMENT INFORMATION PACK(PLURALITY OF TitlePlay) |
|   SUB-PICTURE(CHARACTER STRINGS FOR TITLE NAMES) |
|   MAIN IMAGE(BACKGROUND IMAGE) |

FIG. 13

MANAGEMENT INFORMATION PACK · HIGHLIGHT INFORMATION

| ITEM INFORMATION # 1 | PALETTE CONVERSION RANGE |
| | Title Play Title # 1 |
| ITEM INFORMATION # 2 | PALETTE CONVERSION RANGE |
| | Title Play Title # 2 |
| ITEM INFORMATION # 3 | PALETTE CONVERSION RANGE |
| | Title Play Title # 3 |
| ITEM INFORMATION # 4 | PALETTE CONVERSION RANGE |
| | Title Play Title # 4 |
| ITEM INFORMATION # 5 | PALETTE CONVERSION RANGE |
| | Title Play Title # 5 |
| ITEM INFORMATION # 6 | PALETTE CONVERSION RANGE |
| | Title Play Title # 6 |

FIG. 14

VIDEO MANAGER INTERNAL TITLE SEARCH POINTER TABLE

|  | SEQUENTIAL SINGLE PGC IDENTIFICATION FLAG<br>a141 | TITLE PLAYBACK TYPE<br>NO BRANCH FLAG<br>a142 | NO BRANCH BETWEEN TITLES FLAG<br>a143 | TITLE SET NUMBER | VTS INTERNAL TITLE NUMBER |
|---|---|---|---|---|---|
| TITLE SEARCH POINTER #1 | ON | ON | ON | TitleSet #1 | Title #1 |
| TITLE SEARCH POINTER #2 | OFF | OFF | ON | TitleSet #1 | Title #2 |
| TITLE SEARCH POINTER #3 | OFF | OFF | ON | TitleSet #1 | Title #3 |
| TITLE SEARCH POINTER #4 | OFF | OFF | OFF | TitleSet #1 | Title #4 |
| TITLE SEARCH POINTER #5 | OFF | OFF | ON | TitleSet #1 | Title #5 |
| TITLE SEARCH POINTER #6 | OFF | OFF | OFF | TitleSet #1 | Title #6 |
| TITLE SEARCH POINTER #7 | OFF | OFF | ON | TitleSet #2 | Title #1 |
| TITLE SEARCH POINTER #8 | OFF | OFF | ON | TitleSet #2 | Title #2 |
| TITLE SEARCH POINTER #9 | OFF | OFF | ON | TitleSet #2 | Title #3 |

FIG. 20

| FUNCTION | PERMISSION CONDITION | | |
|---|---|---|---|
| | SEQUENTIAL SINGLE PGC FLAG | NO BRANCH FLAG | NO BRANCH BETWEEN TITLES FLAG |
| CHAPTER NUMBER DISPLAY | ON | ON | — |
| REPRODUCTION PROGRESSION TIME DISPLAY | ON | ON | — |
| CHAPTER NUMBER SEARCH | ON | ON | — |
| TIME SEARCH | ON | ON | — |
| CHAPTER PROGRAMMING FUNCTION | ON | — | — |
| TITLE PROGRAMMING FUNCTION | ON | — | ON |

FIG. 23

| FIRST FLAG | SECOND FLAG | THIRD FLAG | FOURTH FLAG |
|---|---|---|---|
| SINGLE ROUTE INFORMATION | NO LOOP INFORMATION | NO AUTOMATIC BRANCH | NO INTERACTIVE BRANCH |
| ON | OFF | OFF | OFF |

OPTICAL DISC STORING BOTH VIDEO TITLES PROVIDED WITH AV FUNCTIONS AND VIDEO TITLES WITH NO SUCH FUNCTIONS WHICH CAN INSTANTLY DISTINGUISH BETWEEN SUCH KINDS OF TITLES, AND A REPRODUCTION APPARATUS AND REPRODUCTION METHOD FOR SUCH DISC

RELATED APPLICATIONS

This is a divisional application of U.S. Ser. No. 09/102,697, filed on Jun. 22, 1998 now U.S. Pat. No. 6,336,002, which is a continuation of U.S. Ser. No. 08/837,271 filed on Apr. 11, 1997, and issued as U.S. Pat. No. 5,771,334 on Jun. 23, 1998.

BACKGROUND OF THE INVENTION

1. Field of the Invention

The present invention relates to an optical disc onto which an information signal is recorded and to a reproduction apparatus for the disc. In more detail, the present invention relates to an optical disc used for recording multimedia data, such as digital video data, audio data, and graphics data, and to a reproduction apparatus for such optical disc.

2. Description of the Related Art

The achievement of large-capacity optical discs in recent years has led to a great deal of research into the development of multi-title optical discs. Here, the expression "multi-title" refers to the storage of a variety of video titles on a single disc to improve the cost-effectiveness of distribution and retailing of video titles, and, by doing so, increase the value-added of optical discs.

The expression "video titles" is used here to loosely refer to any video production which is represented by one or more sets of route information, which show the reproduction routes to be taken by an optical pickup when reading the optical disc, and sets of video information that are successively read by the optical pickup when tracing one of the reproduction routes. The video information referred to here is multiplexed data (usually referred to as an MPEG stream) which is made up of video data and audio data that have been subjected to compression at a high compression rate according to MPEG (Moving Pictures Experts Group) techniques.

FIG. 1 shows the structure of video titles which are recorded onto a multi-title optical disc. In this drawing, the expression "Single PGC" indicates titles which each only use one set of route information, while "Multi PGC" indicates titles which each include a plurality of sets of route information. The label "Loop present" indicates the presence of a loop attribute in the route information, with this attribute indicating the repetition of the retrieval of image information, while "No loop" indicates that no such loop attribute is present. Similarly, the label "Branch present" indicates the presence of conditional branch information in the route information, this conditional branch information indicating a branch to another set of route information which is performed interactively in response to a user operation.

In FIG. 1, the title for species (1) indicated by the labels "Single PGC", "No branch", and "No loop" is a single sequential title. A single sequential title refers to a title whose reproduction order is fixed according to one set of route information which has the title reproduced in order from the opening scene to the ending scene.

On the other hand, species (4), indicated by the labels "Multi PGC", "No branch", and "No loop", is a multi-sequential title. Here, a multi-sequential title is a title which can be reproduced in a variety of reproduction orders according to a plurality of sets of route information, and so is not simply reproduced from start to end.

Species (2) and (3) indicated by the labels "Single PGC", "No branch", and "Loop present", or "Multi PGC", "No branch", and "Loop present" are quiz-type titles. Quiz-type titles are video titles where the video information indicated by the route information is read many times in a random order. Examples of such quiz-type titles are aerobics titles and educational titles which use drills.

Species (5) and (6) indicated by the labels "Multi PGC", "Branch present", and "Automatic", or by the labels "Multi PGC", "Branch present" and "Interactive" correspond to titles which are known as "interactive titles". Here, interactive titles are titles whose reproduction route dynamically changes in accordance with user operations made in response to menus that are displayed during the reproduction of the title.

The difference between interactive titles with the "Interactive" and "Automatic" labels is that "Automatic" interactive titles include a default reproduction route which is prepared beforehand for the case when no user selection operation of a branch destination is made.

The difference kinds of title in species (1) to (6) are classified depending on the number of reproduction routes, the existence of branch information, and the existence of loop attributes. Here, information for classifying the titles stored on an optical disc into these different types is generally referred to as the "formation" of a title.

The big disadvantage of storing different species (1) to (6) of video titles on a single optical disc is that a complex logical structure is required. Because of this complexity, it is difficult to achieve the reproduction features provided on conventional image reproduction apparatuses such as CD (Compact Disc), laser disc, or video CD players. Here, CD, laser disc, and video CD players are generally regarded as household AV (Audio-visual) appliances, with a search function and a feedback function being examples of the functions provided by such appliances which are problematic for multi-title discs.

The search function provided on a conventional AV appliance enables users to directly input a chapter number, song number, or expected reproduction time which may be written on the case of the disc, and by doing so instantly achieve reproduction of their desired data. The feedback function is a function which displays a chapter number, song number and/or present reproduction time to give the user real-time feedback showing what part of the data is presently being reproduced, with the reproduction time and chapter number being constantly updated as the reproduction of the disc progresses. These AV functions require the establishment of one-to-one correspondence between the disc storage address of a set of data and the chapter number, song number and/or present reproduction time of the set of data. For conventional CDs, video CDs, and laser discs, data is recorded sequentially on a spiral track, so that disc reproduction apparatuses have been able to know the present reproduction time and present chapter number by merely looking at the disc storage address of the data presently being reproduced. As a result, when a chapter number or reproduction time is directly inputted by the user, such reproduction devices have been able to directly jump to the data which corresponds to the user indication. In the following explanation, the case where a jump is performed to data indicated by the input of a reproduction time (so many minutes and seconds) by the user will be referred to as a "time search", while the case when a jump is performed to data corresponding to an inputted chapter number will be referred to as a "chapter search".

For a multi-title optical disc, there is no one-to-one correspondence between disc storage addresses of sets of data and chapter numbers/reproduction time. As a result, it is necessary for disc reproduction apparatuses of multi-title optical discs to perform emulated AV functions. Here, the expression "emulated AV functions" refers to the execution by multi-title disc reproduction apparatuses of functions whose results resemble those of the search function and feedback function of conventional disc players.

When a multi-title optical disc reproduction apparatus is instructed to reproduce a video title, the decision as to whether to perform emulated AV functions for the indicated video title is made based on the number of sets of route information, on the existence of branch information, on the existence of loop attributes, and on the relation between the memory size of the disc reproduction apparatus and the execution speed. Here, it is necessary for the disc reproduction apparatus to determine whether the title only includes one set of route information, whether loop information exists, whether automatic branches exist, and whether interactive branches exist. However, since loop information, automatic branch information, and interactive branch information are distributed across an optical disc, the determination of the presence of each of them takes a considerable amount of processing time.

The following is an explanation of an example operation when a user inserts a multi-title optical disc into the disc reproduction apparatus and indicates the reproduction of one of the titles on the disc. Here, in order to determine whether emulated AV functions can be performed for the selected title, the disc reproduction apparatus has to determine whether there is only one set of route information, whether loop information is present, whether any automatic branches are present, and whether any interactive branches are present. Here, the apparatus can only know whether loop attributes or branch information are included in the sets of route information by referring to all sets of route information used by the indicated title. Here, there is the possibility that even if a first set of route information does not include route information, a second or third set of route information may still include branch information, so that the reproduction apparatus must go to the trouble of referring to all of such sets of route information, thereby consuming a considerable amount of processing time.

The above example corresponds to a title classifying method (used by the present video CD standard) wherein branch information can be provided in sets of route information, although in interactive software developed in recent years, there is an increasing tendency for the provision of far more complex changes in image reproduction by providing route information which contains reproduction control information for performing branches and a variety of other forms of reproduction control.

Aside from the provision of reproduction control information in sets of route information, it is also possible to provide the same kind of reproduction control information in the management information interleaved into MPEG streams, or to distribute reproduction control information between MPEG management information and sets of route information, so that a great variety of story developments can be achieved. As a result, it becomes extremely difficult to detect reproduction control information which is distributed between so many locations to judge whether emulated AV functions are possible. Moreover, the reproduction of video data is performed for units which are several megabytes long, so that the investigation of reproduction control information is included in this kind of MPEG stream requires a memory capacity and disc seek speed which are well beyond the capability of economically-viable disc reproduction apparatuses.

In view of the difficulties when a plurality of titles are to be stored on a single optical disc, it has been suggested that AV functions should not be provided for any of the titles on a multi-title disc. However, in such a case, when viewing a same kind of title as was available for conventional video CD or laser disc, the user will not be able to make use of the AV functions to which he/she has become accustomed, thereby preventing jumps to a specified chapter number or reproduction time. This will not meet the user expectations for such reproduction and can potentially lead to user dissatisfaction with this kind of equipment.

SUMMARY OF THE INVENTION

The primary object of the present invention is to provide a optical disc and disc reproduction apparatus which can instantly distinguish whether emulated AV functions are possible for a title, even when video titles of a variety of types are recorded on a same optical disc. In more detail, the primary object of the present invention is to provide a optical disc and disc reproduction apparatus which, even if there are great discrepancies in the number of sets of route information used by titles, and if there is the possibility that branch information for branches to different sets of route information are present in both the variable code-length data (such as video data of several megabytes in length) and the route information, can still instantly distinguish whether emulated AV functions are possible for a title.

In order to achieve the stated object, the optical disc of the present invention is an optical disc which includes a title area and a manager area. The title area stores a plurality of video titles which are video productions that are expressed using route information showing a route to be taken by an optical pickup and a plurality of sets of video information which are read in accordance with the route information. The manager area stores information for managing the video titles stored in the title area. Here, the titles stored in the title area include a first type which are expressed using one set of route information, a second type expressed using a plurality of sets of route information and branch information for establishing interactive branch control, and a third type expressed using a plurality of sets of route information but no branch information.

The manager area is characterized by including an address management area for storing management information for managing the address of each video title, and a reproduction type information area for storing reproduction type information which includes a first flag corresponding to the management information for each video title which shows whether the title is expressed by a single set of reproduction information or a plurality of sets of reproduction information and a second flag which shows whether the title is expressed using any branch information.

With the stated construction, reproduction apparatuses can instantly know whether each title includes branch information which may be present in management information which can be in any set of route information or management information that is interleaved into image information which can be tens of megabytes in size.

As a result, even when a user attempts to perform a chapter search or time search immediately after loading an optical disc into a reproduction apparatus, the reproduction apparatus can immediately determine whether such chapter search and time functions should be enacted or prohibited.

With the present disc, it is possible to record titles which contain a great variety of possible story developments due to the existence of branch information in both the management information and the route information on a same disc as orthodox titles for which emulated AV functions can be performed during reproduction. Chapter number display and reproduction elapsed time display are only performed for appropriate titles, with the reproduction apparatus prohibiting display when not appropriate. In this way, the system ensures that inappropriate chapter or reproduction time display is not performed.

The reproduction apparatus for the present optical disc may comprise an optical pickup for optically reading data stored on the optical disc, a drive mechanism for the optical disc, a first control means for controlling the drive mechanism to read the recorded content of the manager area, a manager buffer for storing the content read from the manager area, a first receiving means for receiving an indication of a selection of an image title to be reproduced from the user, a calculation means for referring to the manager buffer and calculating an address of the title received by the first receiving means, a second control means for controlling the drive mechanism to read the video title from the address calculated by the calculation means, a judging means for referring to the first and second flags in the reproduction type information corresponding to the selected title and judging whether execution of AV functioning is possible for the selected title, and an AV function executing means for executing AV functions when judged possible, the AV functions at least including a search function for searching to an arbitrary position in a title based on an appropriate indication and a feedback function for monitoring and displaying a reproduction elapsed time. With this construction, the reproduction apparatus can instantly know whether each title includes branch information which may be present in management information which can be in any set of route information or management information that is interleaved into image information which can be tens of megabytes in size.

As a result, even when a user attempts to perform a chapter search or time search immediately after loading an optical disc into a reproduction apparatus to view a desired scene, the reproduction apparatus can immediately determine whether such chapter search and time functions should be enacted or prohibited.

The present reproduction is also able to reproduce titles which contain a great variety of possible story developments due to the existence of branch information in both the management information and the route information in addition to orthodox titles for which emulated AV functions can be performed during reproduction.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 2A shows the appearance of the optical disc used in the present embodiment;

FIG. 2B shows a cross-section of the optical disc;

FIG. 2C shows an enlargement of the area around the focused spot of the laser beam;

FIG. 2D shows sequences of pits in the information layer 109;

FIG. 4B shows the basic arrangement of the file layer and the application layer;

FIG. 5B shows the internal composition of the VOBs which are included in the group of video materials of Video Title Set V1;

FIG. 9 shows an example of the internal composition of the VTS internal title search pointer table;

FIG. 10A shows the internal composition of the PGC information management information table in a set of VTS management information;

FIG. 10B shows the format of the PGC information;

FIG. 10C shows the internal composition of the VOB position information table;

FIG. 11 shows an example of the internal composition of the Video Manager;

FIG. 13 shows an example of the internal composition of the Highlight information for a volume menu;

FIG. 14 shows an example of the internal composition of the VM internal title search pointer table;

FIG. 20 shows an example of the permitted function table 763;

FIG. 23 shows another example of the flag composition of the title playback types.

DESCRIPTION OF THE PREFERRED EMBODIMENTS

Figure 1:
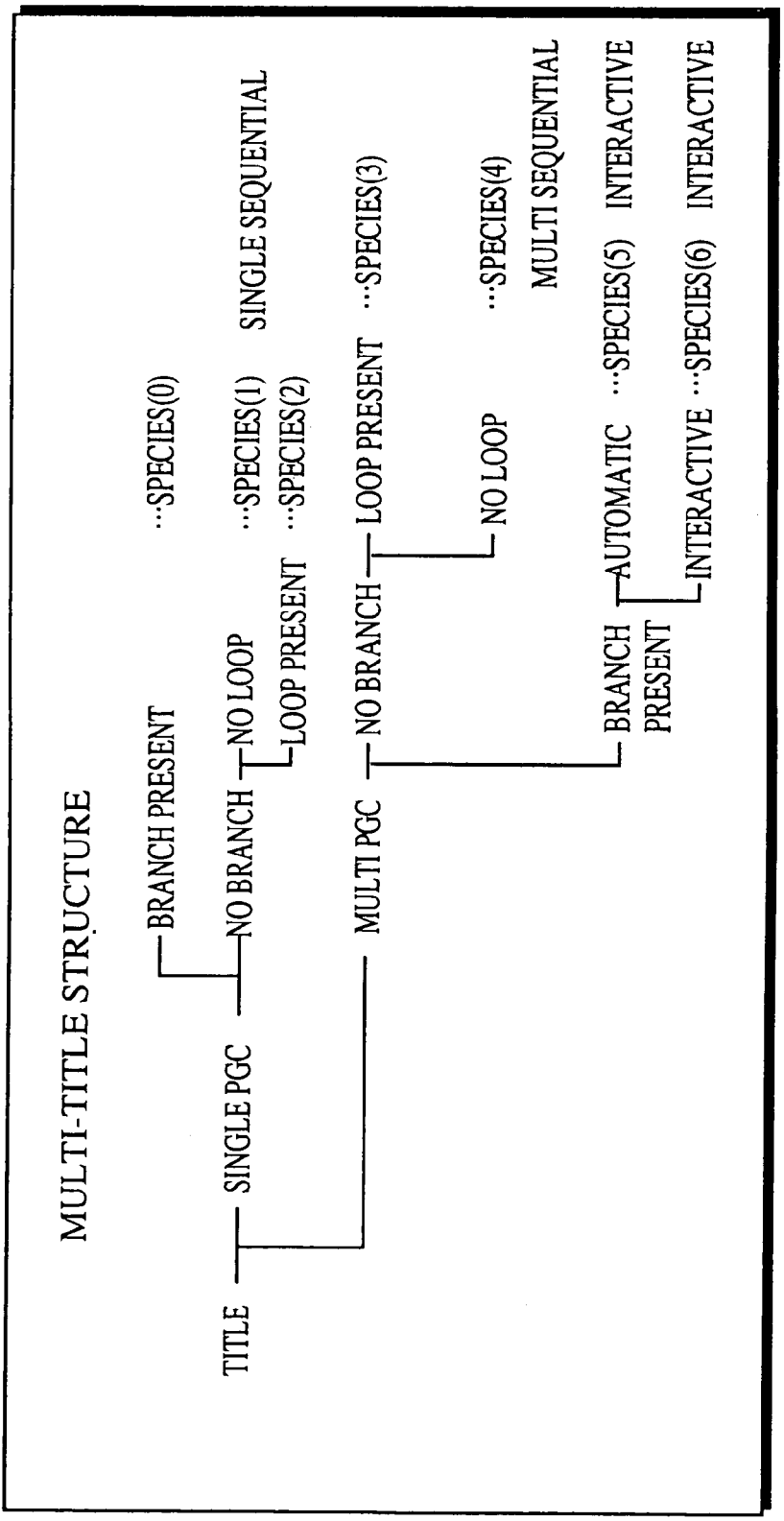
FIG. 1 shows examples of the kinds of titles that are stored on a multi-title disc.

In order to assist the reader's understanding, the following explanation has been divided into items which have each been given an index number. Here, the number of digits in the index number indicates the level of the item in question in the overall structure of the explanation. Here, the highestranked classification numbers are (1) and (2), with (1) relating to the optical disc and (2) relating to the reproduction device (disc player).
(1) Physical Construction of the Optical Disc
(1.1) Logical Construction of the Optical Disc
(1.1.1) Logical Construction . . . Video Title Set
(1.1.1.1) Video Title Set . . . Video Object (VOB)
(1.1.1.1.1) Video Object (VOB) . . . Management Information Pack
(1.1.1.2) Video Title Set . . . -Video Title Set Management Information
(1.1.1.2.1) Video Title Set Management Information-PGC information
(1.1.2) Logical Construction-Video Manager
(2.1) Outline of the Disc Reproduction Device
(2.2) Construction Elements of the Disc Reproduction Device
(2.2.1) Disc Reproduction Device . . . Construction of Signal Separating Unit 86
(2.2.2) Disc Reproduction Device . . . Construction of System Control Unit 93

(1) Physical Construction of the Optical Disc

A digital video disc (DVD) which has a diameter of 120 mm and has a storage capacity of 4.7 GB on one side is ideally suited for use as the optical disc of the present embodiment.

FIG. 2A shows the appearance of the optical disc, while FIG. 2B shows its cross-section, and FIG. 2C shows an enlargement of the circled part of FIG. 2B. Starting from the bottom of this figure, DVD 107 is formed of a first transparent substrate 108, an information layer 109, a bonding layer 110, a second transparent substrate 111 and a print layer 112 for printing a label.

The first transparent substrate 108 and the second transparent substrate 111 are reinforcing substrates which are made of a same material and are around 0.6 mm thick. This is to say, both substrates are roughly 0.5 mm–0.7 mm thick.

The bonding layer 110 is provided between the information layer 109 and the second transparent substrate 111 to bond them together.

The information layer 109 includes a reflective membrane, such as metal foil, which is attached to the first transparent substrate 108. Here, a high density of indented and protruding pits is formed in this reflective membrane by a manufacturing process.

The shape of these pits is shown in FIG. 2D. As shown in FIG. 2D, the length of the pits varies between 0.4 μm and 2.13 μm, with the pits being aligned in a spiral with radial intervals of 0.74 μm between them to form one spiral track.

By shining the laser beam 113 on these pits and measuring the changes in the reflection ratio of the light spot 114 shown in FIG. 2C, information can be retrieved from the disc.

The light spot 114 on a DVD has a diameter of around 1/1.6 times the diameter of a light spot on a conventional CD due to an increase in the numerical aperture (NA) of the objective lens and a reduction in the wavelength of the laser beam.

DVDS of the physical construction described above can store around 4.7 GB of information on one side, which is almost eight times the storage capacity of a conventional CD. As a result, it is possible to achieve a great improvement in picture quality for moving pictures and to increase the reproduction time from the 74 minutes which is possible with a video CD to over two hours.

The substrate technique which has enabled this improvement in storage capacity is a reduction of the spot diameter D of the laser beam. Here, spot diameter D is given by the equation "D=laser wavelength/numerical aperture of objective lens NA", so that the spot diameter D can be reduced by reducing the laser wavelength and by increasing the numerical aperture of objective lens NA. It should be noted here that if the numerical aperture of objective lens NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate.

Data is read from DVDs using an optical system with a short wavelength (650 nm) red semiconductor laser and an objective lens whose NA (numerical aperture) can be enlarged up to around 0.6 mm. If the thickness of the transparent substrate is reduced to around 0.6 mm, a storage capacity of up to 4.7 GB can be achieved for one side of a 120 mm diameter optical disc.

Figure 3A:
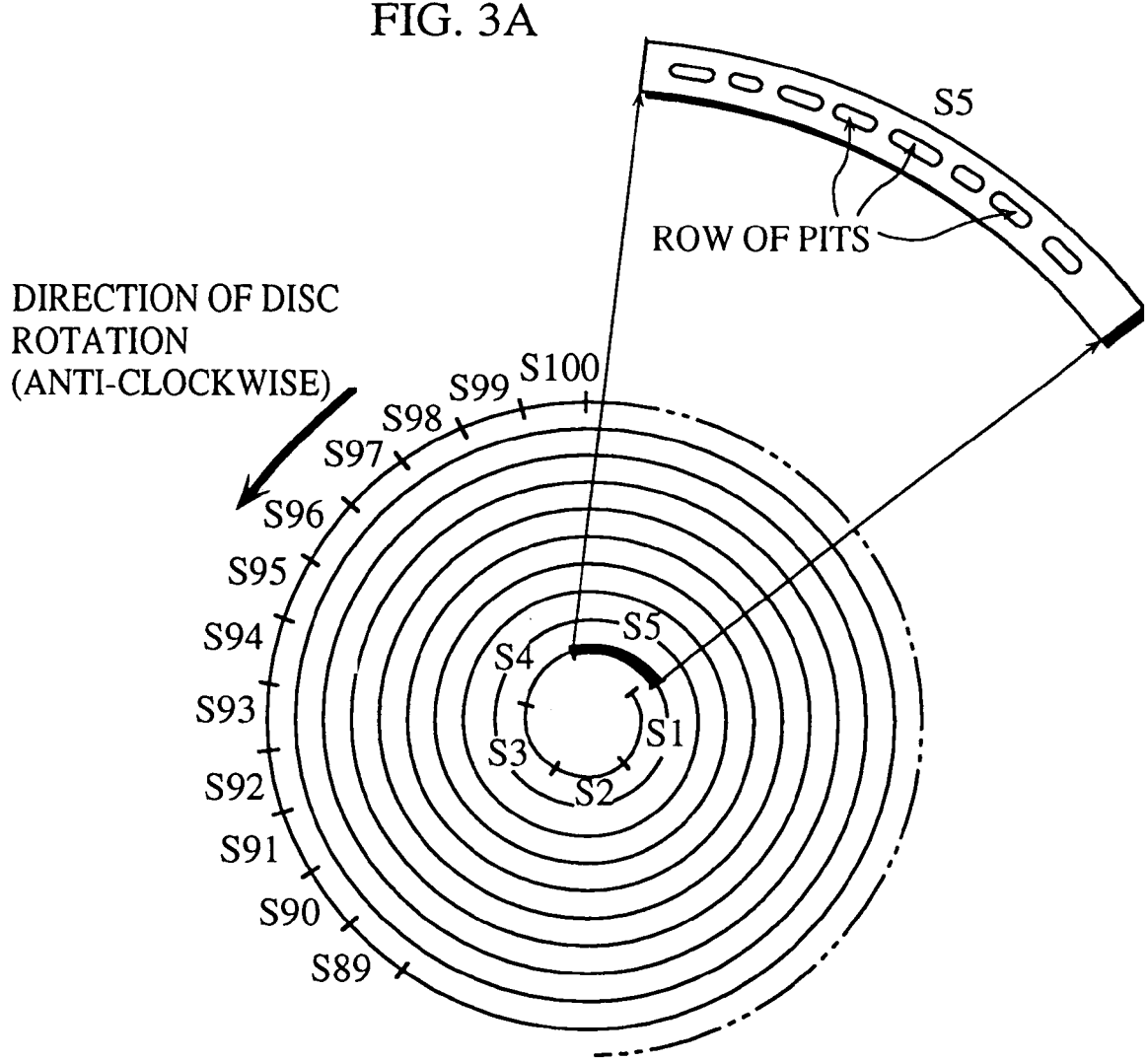
FIG. 3A shows the track arrangement of the information layer of the optical disc.

FIG. 3A shows the arrangement when the spiral track is formed leading from the inner periphery to the outer periphery of the information layer 109, with a very large number of physical sectors being formed on this spiral track. In the present embodiments, a physical sector is a curved area on the spiral track, and is the smallest unit of data which can be reliably retrieved.

Figure 3B:
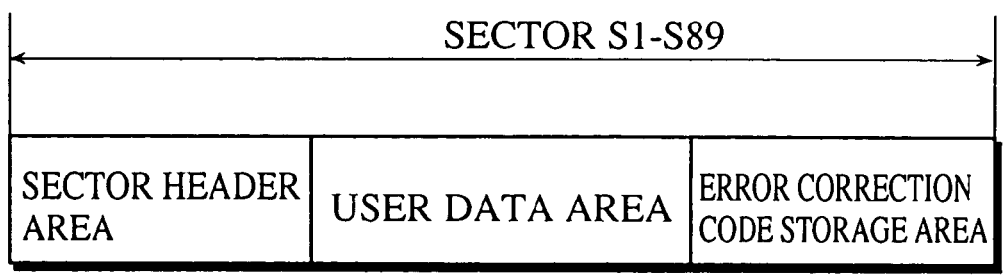
FIG. 3B shows the physical sectors of the information layer of the optical disc.

Each sector has the internal construction shown in FIG. 3B to ensure the reliability of data retrieval. As shown in FIG. 3B, each sector is made up of a sector header area which is used to identify the respective sector, a user data area for storing 2 Kbytes of data, and an error correction code storage area which stores an error correction code for the user data area in the same sector. When reading the user data area in the same sector, a disc reproduction device uses the error correction code to detect any errors in the sector, and performs error correction when such errors are detected.

(1.1) Logical Construction of the Optical Disc

Figure 4A:
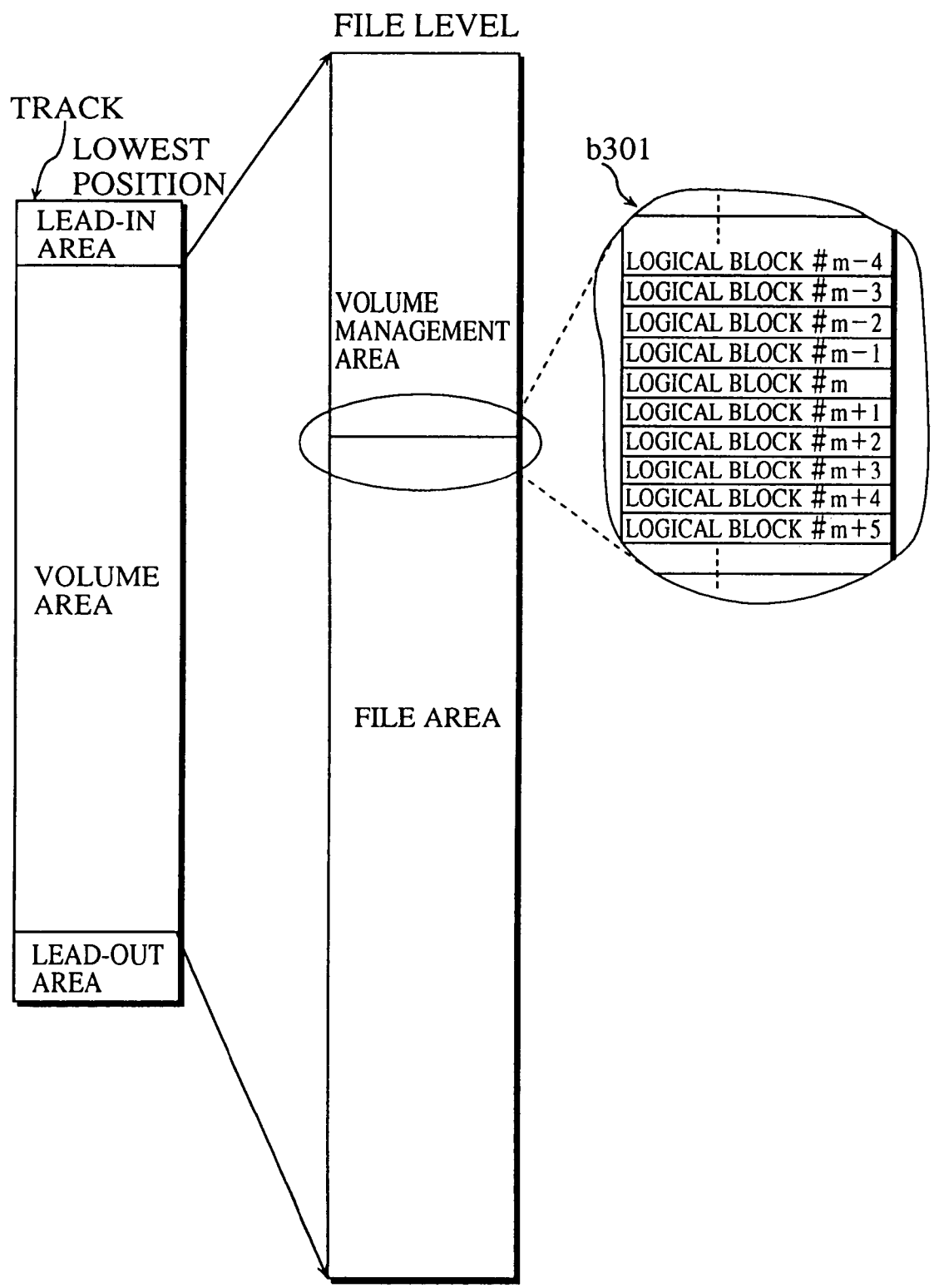
FIG. 4A shows the logical construction of the optical disc.

The following is an explanation of the logical construction of the optical disc. This logical construction is made up of a three-level hierarchy. The hierarchy is made up of a lowest level whose logical construction is oriented towards the firmware of the disc reproduction apparatus, a file level whose logical construction is oriented towards the operating system of a personal computer or workstation, and an application level which has a multi-title logical construction. Here, the logical construction of the lowest level is shown in FIG. 4A and the logical constructions of the file level and the application level are shown in FIG. 4B.

The following explanation will first deal with the lowest level whose logical construction is oriented towards firmware. Here, firmware refers to the control program for controlling a mechanical construction which includes a spindle motor and an actuator for an optical pick-up. In order from the top of FIG. 4A, the logical format of the lowest level is composed of a lead-in area which has identification information included in a sector address, a volume area and finally a lead-out area, so that on reading such, the firmware has the spindle motor and actuator of the optical pickup activated.

The lead-in area stores operation stabilization data and the like which is used when the disc reproduction apparatus starts reading data from the optical disc. The lead-out area informs the reproduction device of the end of reproduction and does not store meaningful data.

The volume area is an area for storing many kinds of data, as well as for managing the physical sectors to which the volume area belongs as logical blocks. These logical blocks are identified by firmware using serial numbers which are assigned to consecutive physical sectors, with the first physical sector in the data recording area being assigned the number zero. The enlarged portion "b301" of FIG. 4A shows a group of logical blocks in the volume area. Here, the figures, #m, #m+1, #m+2 and #m+3 which are appended to the logical blocks in this circled area are the logical block numbers.

The following is an explanation of the file level and the application level. This file level and application level exist in the volume area shown in FIG. 4A.

The file level is divided into a volume management area and a file area. The volume management area stores file system management information which is used to manage a plurality of logical blocks as files, in accordance with IS013346 Standard. The file system management information shows the relations between the file names for a plurality of files and addresses of the groups of logical blocks which contain the corresponding files. This file system management information is used by the disc reproduction device to access the disc in file units. More specifically, on being given a file name by an application program, the operating system of a personal computer or workstation refers to all the system management information to calculate all of the groups of logical blocks for the file, before accessing these groups of logical blocks to fetch the desired digital data.

The following is an explanation of the logical construction of the application level. The information in this application level can be most loosely classified into a Video Manager and a plurality of Video Title Sets. Here, a Video Title Set is a group of movie titles which are classified from the viewpoint of common use of a same set of video material, while the Video Manager is information for managing all of the groups in the title sets as a single set. In the example shown in FIG. 4B, the grouping of video materials included in Video Title Set V1 is a collection of action scenes used in an action movie, while the grouping of video materials included in Video Title Set V2 is a collection of images shot on location at historical sites around the world.

Using the video materials included in Video Title Set V1, the title developer can produce a disc whereby a user may enjoy a no-cut version of action movie A, a general cinema release of action movie A, a television broadcast version of action movie A, an interactive version of action movie A, or a picture profile of the cast of action movie A. By making good use of common video materials on a single disc in this way, the developer can provide a plurality of applications to the user.

Using the video materials included in Video Title Set V2, the title developer can produce a disc whereby a user may enjoy a documentary about the excavation of historical sites, a multimedia guide to historical sites, an adventure game where participants search for historical sites, or a quiz about historical sites around the world. By making good use of common video materials on a single disc in this way, the developer can provide a plurality of applications to the user.

By classifying video titles in this way, it is possible to have a plurality of titles with common video materials grouped together.

(1.1.1) Logical Construction of Video Title Set

A Video Title Set consists of a set of Video Title Set management information and a group of video materials.

Figure 5A:
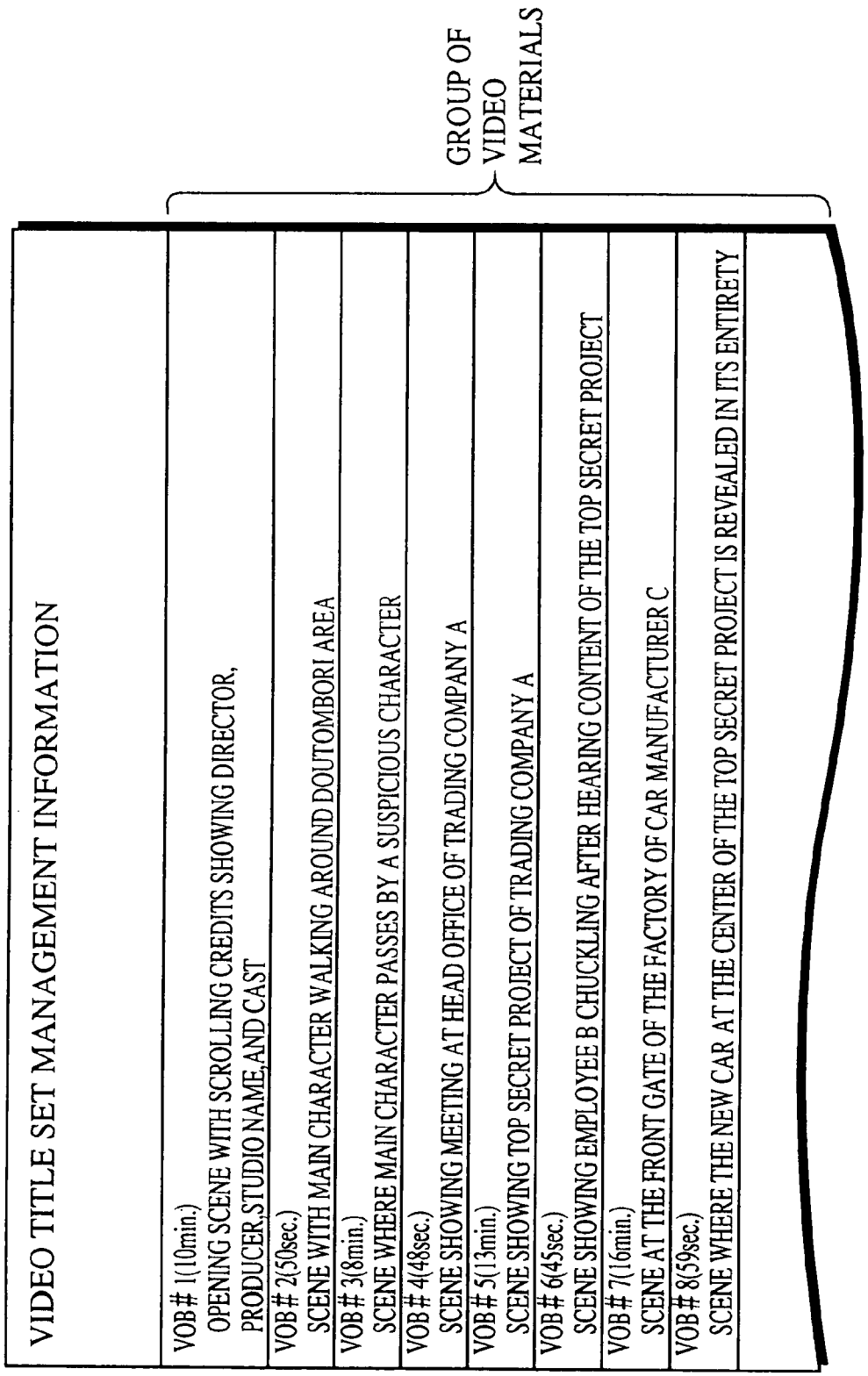
FIG. 5A shows an example of a group of video materials which belong to Video Title Set V1.

The following explanation will first deal with the group of video materials in the Video Title Set. Normally, when a movie is recorded onto film or video tape, an editing process is performed whereby only the required scenes are cut from the master tape after filming and are arranged into the order of the story, but when such scenes are recorded into a Video Title Set, such editing operations are not performed. This is to say, there are no traces of an editing process in which only the necessary parts of the necessary scenes are extracted and arranged into the order of the story. In fact, a Video Title Set can store video materials in a completely random order without any extraction of necessary materials from the original footage. The group of video materials which are stored in Video Title Set V1 are shown in FIG. 5A. While the scenes in FIG. 5A may be construed as forming the order of a story, this is merely for the sake of explanation, and in no way represents a necessary condition for the storage of a group of video materials.

The Video Title Set V1 in FIG. 5A includes a plurality of video objects (VOBs) which each have different reproduction times. Here, the expression "VOB" refers to one set of multiplexed stream data that is made up of various kinds of stream data, such as video data, audio data, sub-picture data, and control data, which are of variable code length, or in other words, an MPEG stream which is the unit used for one scene on a DVD. In the figure, VOB#1 has a reproduction time of ten minutes, and is an opening scene with scrolling credits showing the names of the director, the producer, the studio, and the cast. As another example, VOB#2 has a reproduction time of fifty seconds and is a scene which shows the main character walking around the Doutomburi area of Osaka City. This scene is actual footage shot using famous actors on location.

FIG. 5B shows how the sets of stream data of variable code length are multiplexed into one VOB. Here, each VOB is composed of a plurality of VOB units which are arranged in a time series starting from the first VOB unit. Each VOB unit which forms part of a VOB is a set of multiplexed data with a reproduction time which is usually 0.5–1.0 seconds. Here also, the variable code length data which can be multiplexed into a VOB is made up of video data, audio data, and sub-picture data, with the sets of these kinds of data which are multiplexed into each VOB unit being called video packs, audio packs, and sub-picture packs, each being 2K bytes in size.

In the example shown in FIG. 5B, VOB#1, whose reproduction time is ten minutes, is made up of 1,200 (=10*60*2) VOB units, while VOB#2, whose reproduction time is fifty seconds, is made up of 100 (=50*2) VOB units. In the same way, VOB#3, whose reproduction time is eight minutes, is made up of 900 (=8*60*2) VOB units, while VOB#4, whose reproduction time is forty-eight seconds, is made up of 96 (=48*2) VOB units.

While the VOB units in each VOB are arranged into a time series, each pack in each VOB unit is arranged in an order which, with the exception of the provision of the pack management information at the front, is completely random in terms of number of packs and pack order. This is to say, there can be VOB units which have the order audio data, sub-picture data, video data, and other VOB units which have the order, sub-picture data, video data, audio data. As other examples, there may also be VOB units which are made up of three hundred or so packs of nothing but video data, and other VOB unit which are made up of five hundred or so packs.

Here, the reason the order of the packs can be different for each VOB unit is that it is not necessary for packs of a same kind to be next to each other when the variable code length data is fetched and buffered by a reproduction apparatus. The example shown in FIG. 5B has the packs arranged into a regular order in each VOB unit, although this is merely for the sake of explanation and is not a necessary condition for the data construction.

The reason why there is a variable number of video and sub-picture packs is that these kinds of data are coded with a variable code length, so that even if both kinds of pack have a reproduction time of 0.5–1.0 seconds, there is a considerable difference in the amount of data which is required to achieved such reproduction. The most clear example is data for a moving image. When reproducing a background still image for 0.5 seconds, or a static close-up of a character's facial expression for 0.5 seconds, only a small amount of data is necessary. However, to reproduce a moving image of an actor whose movements are pronounced, a much larger amount of data is required. This large discrepancy in the amount of data is due to the fact that the reproduction of a static image, such as the background image or the character's expression, can be achieved using only one frame which is subjected to frame internal decoding and field internal decoding, while action scenes and car chase scenes need to utilize movement compensation prediction to compensate for the movement of the object being filmed.

Large discrepancies are also present for sub-picture data, so that there are large differences in the amount of subtitle information between scenes where the characters are engaged in a lively argument, and scenes where the characters are calmly shaking hands, which in turn leads to differences in the number of sub-picture packs provided in each VOB unit for a reproduction time of 0.5 seconds.

To achieve reproduction with the unit time at 0.5 seconds, it is necessary to inform the disc reproduction apparatus before the start of the 0.5 second period where it is sufficient to transfer only a small amount of data, or whether a large amount of data is required, and to have the decoder provided in the disc reproduction apparatus perform decoding for the necessary amount of transferred data. Here, to have variable code-length data reproduced with a uniform reproduction time of 0.5 seconds, a management information pack is provided at the start of each set of VOB unit, with this management information pack indicating transfer rate which is required for the reproduction of the VOB unit to which it belongs, as well as the transfer rate and buffer size which are required by each of the video stream, the audio stream, and the management information stream in the VOB unit. By having the management information pack specify the transfer rates in this way, the disc reproduction apparatus is able to decode the video data, audio data, and sub-picture data which follows the management information pack. To give a specific numerical example, 0.5 seconds of video reproduction will generally require several hundred video packs, with the reproduction device being informed of a necessary transfer rate in the region of 4.5 Mbit/second before such number of packs are read from the DVD to enable the decoding of such number of video packs.

For the example shown in FIG. 5B, if each VOB unit is considered as comprising an average of 200 packs, VOB#1, which has a reproduction time of ten minutes and is made up of 1,200 (=10*60*2) VOB units, will be made up of 240,000 packs. Of these, 1,200 will be management information packs. Since the size of each pack is standardized at 2 Kbytes, the storage of this VOB#1 will take up a 480 Mbyte (=240,000*2 Kbyte) area on a DVD.

In the same way, VOB#3, which has a reproduction time of eight minutes and which is made up of 960 (=8*60*2) VOB units, will be made up of 192,000 packs, so that the storage of VOB#3 on a DVD will take up a 384 Mbyte (=192,000*2 Kbyte) area.

VOB#4, which has a reproduction time of forty-eight seconds and which is made up of 96 (=48*2) VOB units, will be made up of 19,200 packs, so that the storage of VOB#3 on a DVD will take up a 38.4 Mbyte (=19,200*2 Kbyte) area.

The video packs stored in a video object (VOB) are arranged so that the digital data in the video packs in one VOB unit forms at least one set of digital video data called a group of pictures (GOP). Here, the expression "group of pictures" refers to the unit which is used when decompressing compressed digital video data, and is made of around twelve to fifteen frames of video data. The details of GOPs are standardized according to the MPEG2 (Moving Pictures Experts Group) standards, ISO 11172 and ISO 13818.

Figure 6:
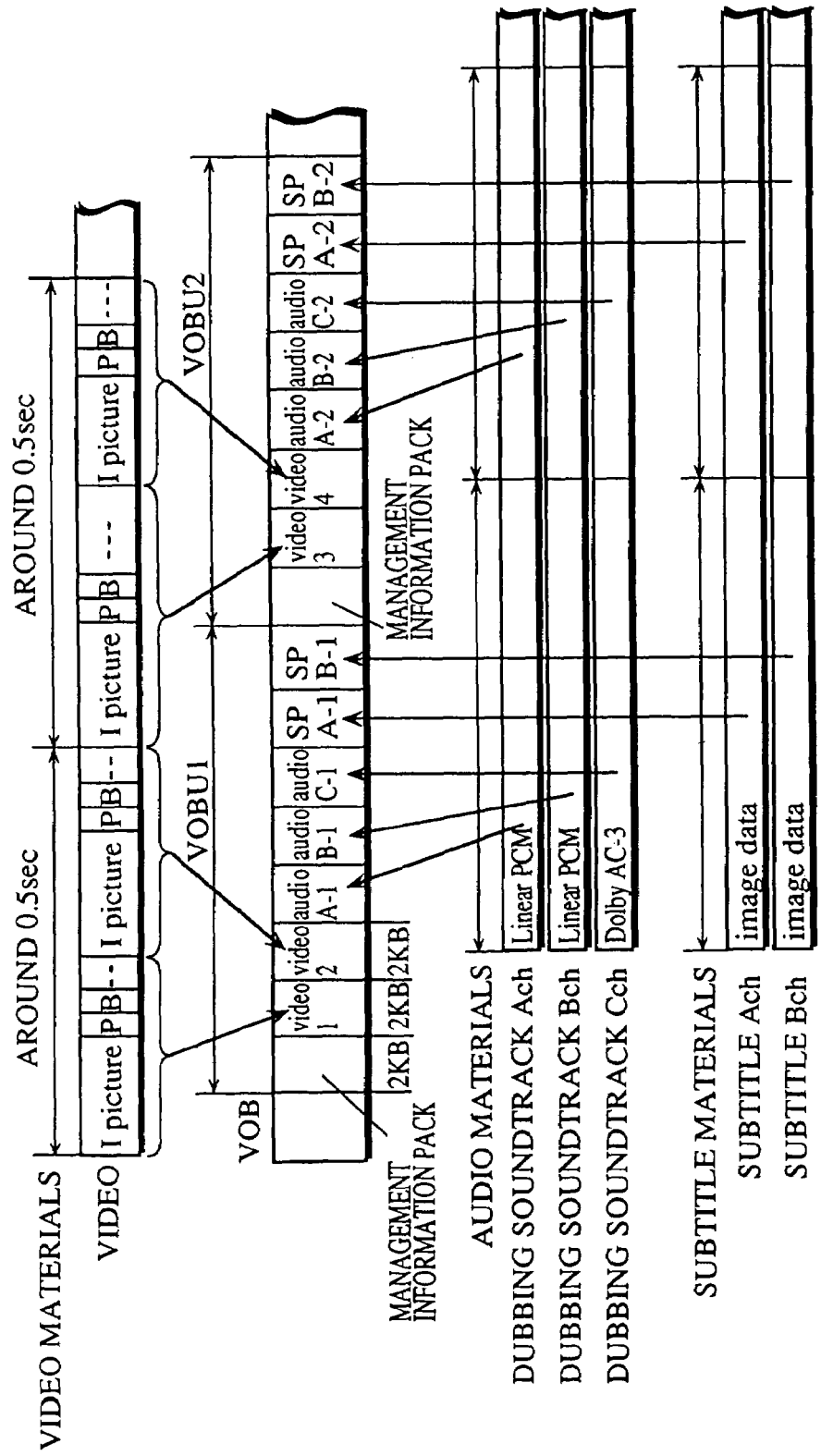
FIG. 6 shows the correspondence between the video materials, audio materials, and subtitle materials and each pack in a video object (VOB)

FIG. 6 shows the relation between each pack in a video object (VOB) and a video scene. In the figure, the video material in this one scene is depicted using a long horizontal strip which has been positioned above the VOB. Three channels of audio materials and two channels of subtitle materials are also given below the VOB. In FIG. 6, the arrows shown extending downwards from the video materials show how the video materials are stored in each video pack provided in the data field of the VOB.

By tracing the arrows from the video materials, it can be seen that the video from the start of reproduction of the scene to the 0.5 second mark is coded into I pictures (Intra-pictures), P pictures (Predicative pictures), and B (Bidirectionally predicative pictures) and then stored in the data fields of video packs 1 and 2 in VOB unit 1. As described above, the video data will in reality be stored in several hundred video packs, though, for ease of explanation, only two of such packs have been shown in FIG. 6. In the same way, the video from the 0.5 second mark to the 1.0 second mark is coded in I pictures, P pictures, and B pictures and is then stored in the data fields of video packs 3 and 4 in VOB unit 2. Although not shown in the drawing, the video from the 1.0 second mark to the 1.5 second mark is coded and stored in the data fields of the video packs in the next VOB unit.

The following is an explanation of the relation between the three channels of dubbing soundtracks for one scene and the audio packs in the data field of the VOB. In the same way as with the video data, the arrows extending away from the audio materials to the audio packs in the VOB show that the audio materials are subjected to one of two kinds of coding and are stored in the data field of each audio pack in 0.5 second units. This is to say, the dubbing soundtrack on channel A from the start of the reproduction of the scene to the 0.5 second mark is recorded in the data field of audio pack A-1 of VOB unit 1, while the dubbing soundtrack on the same channel from the 0.5 second mark to the 1.0 second mark is stored in the data field of audio pack A-2 in VOB unit 2. Although not shown in the drawing, the audio on this channel from the 1.0 second mark to the 1.5 second mark is coded and stored in the data field of the audio pack A-3 in the next VOB unit. As described above, synchronization between audio and video is achieved using a PTS (Presentation Time Stamp) which is standardized under MPEG, so that it is not necessary for all of the audio data to be included in the same VOB units as the video data to which it corresponds, so that such audio data may in fact be stored in a preceding or succeeding VOB unit, for example.

The dubbing soundtrack on channel B from the start of the reproduction of the scene to the 0.5 second mark is recorded in the data field of audio pack B-1 of VOB unit 1, while the dubbing soundtrack on the same channel from the 0.5 second mark to the 1.0 second mark is stored in the data field of audio pack B-2 in VOB unit 2. Although not shown in the drawing, the audio on this channel from the 1.0 second mark to the 1.5 second mark is coded and stored in the data field of the audio pack B-3 in the next VOB unit.

The dubbing soundtrack on channel C from the start of the reproduction of the scene to the 0.5 second mark is recorded in the data field of audio pack C-1 of VOB unit 1, while the dubbing soundtrack on the same channel from the 0.5 second mark to the 1.0 second mark is stored in the data field of audio pack C-2 in VOB unit 2. Although not shown in the drawing, the audio on this channel from the 1.0 second mark to the 1.5 second mark is coded and stored in the data field of the audio pack C-3 in the next VOB unit.

The audio data on the three channels which are distributed among the data fields of audio pack A-C will hereinafter be referred to as audio data A, audio data B, and audio data C. As one example, a dubbing soundtrack in English can be set as audio data A, a dubbing soundtrack in French can be set as audio data B, and a dubbing soundtrack in Japanese can be set as audio data C, so that the user can switch between them as desired.

In the example shown in FIG. 6, two sub-picture packs A,B are present in each VOB, so that two channels of subtitles can be stored distributed between the data fields of sub-pictures A, B in each VOB unit. As one example, English subtitles can be displayed as sub-picture data A, with French subtitles being displayed as sub-picture data B, so that the user will be able to switch between them.

By sorting the pack data according to type and recombining, digital data sequences which are formed of video data, audio data, sub-picture data, or control data are produced. These sorted and recombined groups of pack data are called elementary streams, so that each VOB is a program stream, or "system stream" which is made up of a plurality of these elementary streams.

(1.1.1.1) Video Object (VOB)-Management Information Pack

Management information packs have been described above as specifying a transfer rate and as being arranged at the front of each VOB unit. Since a management information pack is stored at the front of each VOB unit, each management information pack is only opened in a buffer in the disc reproduction apparatus for the 0.5 seconds while the video packs, audio packs, and sub-picture packs in the first VOB unit are read and reproduced, before the management information pack in the next VOB unit is read. Once this 0.5 period has expired, the next management information pack is overwritten into the buffer. Since each management information pack is only opened in the buffer during the reading of the video, audio, and sub-picture packs in the same VOB unit, in addition to the transfer rate, control information which only applies to the present VOB unit can be indicated to the disc reproduction apparatus for only the 0.5–1.0 second period for which the video, audio, and sub-picture packs in the present VOB unit are reproduced.

Figure 7:
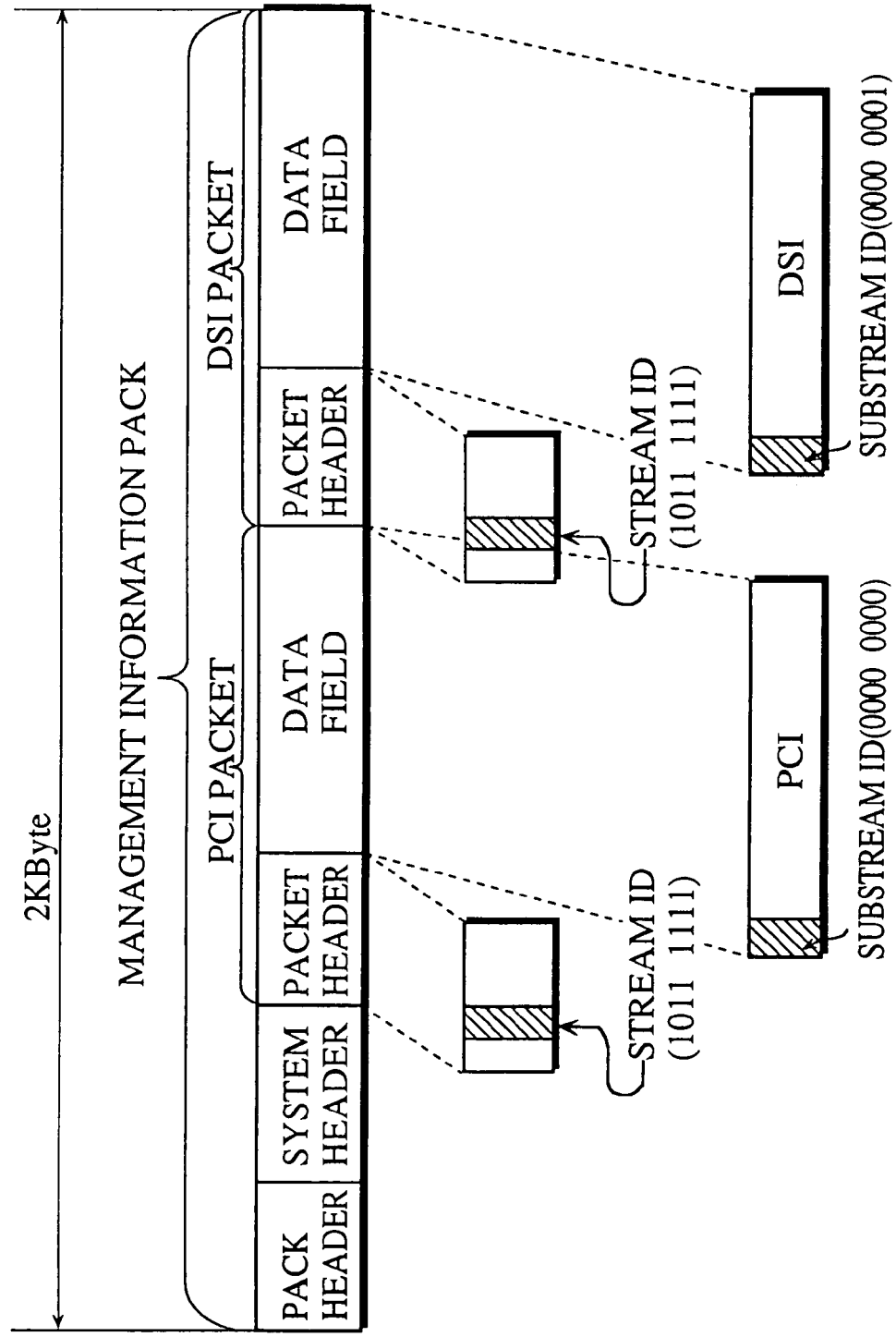
FIG. 7 shows the internal composition of a management information pack.

FIG. 7 shows the data construction of the management information pack. While the video packs, audio packs, and sub-picture packs are each formed of one packet, the management information packs are each formed of two packets. Of these, one packet is called a PCI packet (Presentation Control Information packet) and the other is called a DSI packet (Data Search Information packet). The data construction of a management information pack is somewhat different to that of a video packet or an audio packet in that it is made up of a "pack header", a "system header", a "packet header for PCI packet", a "data field for PCI packet", a "packet header for DSI packet" and a "data field for DSI packet".

The system header stores management information for the entire VOB unit which has this management information pack at the front, according to MPEG standards. It stores the overall necessary transfer rate and an indication of a transfer rate and buffer size for each of the video stream, the audio stream, and the sub-picture stream.

The stream IDs of the two packet headers in a management information pack, as shown by the oblique shading in FIG. 7, is set at the identification code "1011 1111" which indicates "private stream 2".

The PCI packet contains the Highlight information which is used to perform reproduction control in accordance with cursor operations for menus and confirmation operations for items, when the sub-picture pack is used to display a menu made up of a plurality of items. In the present embodiment, branches of reproduction route which perform a switch from a present reproduction route to another reproduction route are a representative example of such "reproduction control in accordance with confirmation operations". Here, switching of reproduction route is performed by having commands, named "Highlight commands", stored in the Highlight information corresponding to each item in a menu, and by having these commands executed when the management information pack is read by the disc reproduction apparatus. Since these commands which correspond to each item, which in turn correspond to the confirmation operation, are executed selectively, reproduction routes can be switched in units of one set of PGC information. PGC information is described in more detail later in this specification.

A DSI packet stores information which is necessary for the reproduction of an MPEG stream from the present data position. Each DSI packet also stores the addresses of the preceding and succeeding DSI packets, which are referred to when special reproduction functions, such as fast forward, are performed.

This concludes the explanation of video objects (VOB), so that the following explanation will deal with the composition of the Video Title Set management information in the Video Title Set.

(1.1.1.2) Video Title Set-Video Title Set Management Information

The Video Title Set management information is a collection of control information for reproducing the video materials, which have not been subjected to any editing processes and have not been arranged in order of reproduction, so that they make up one video title.

Figure 8:
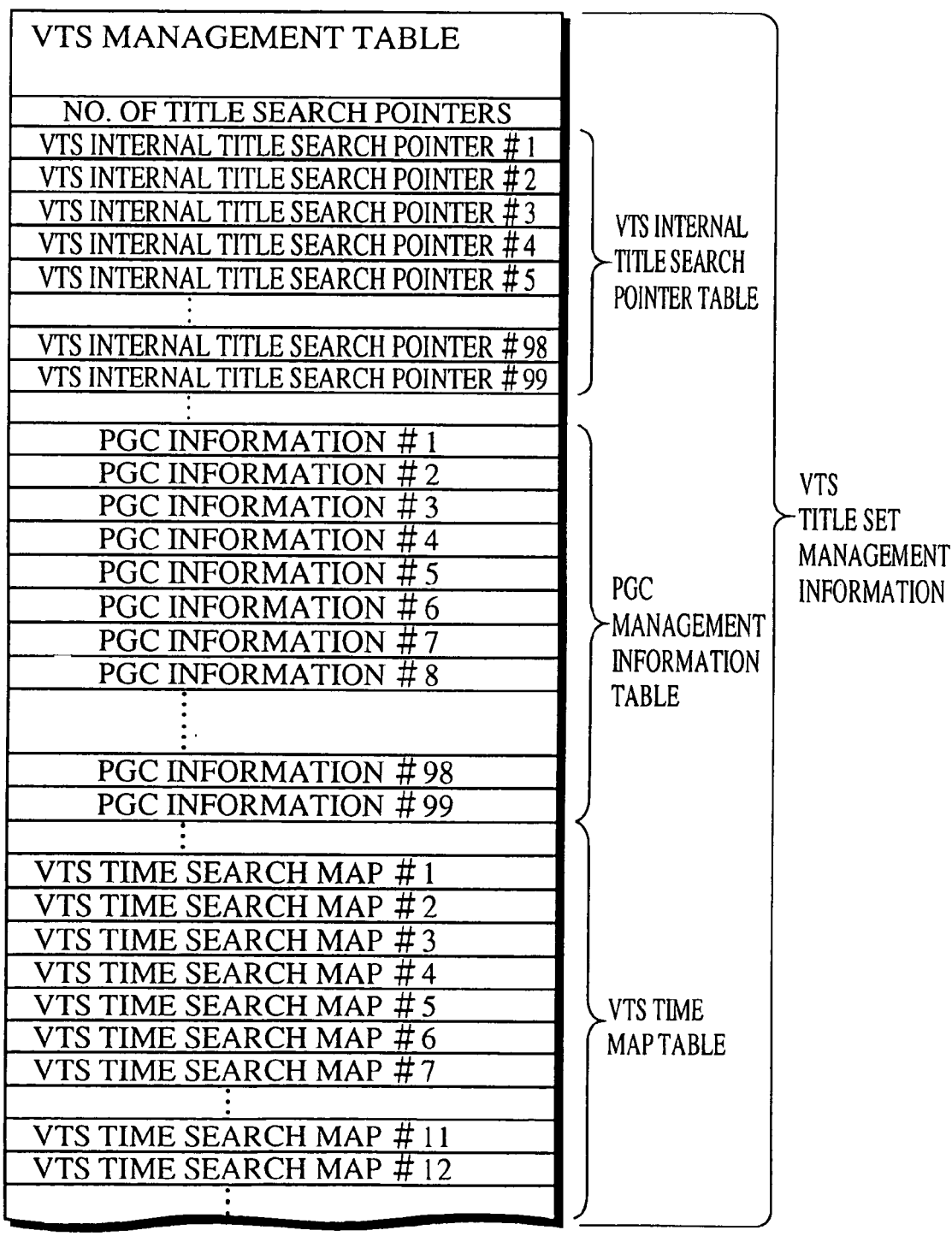
FIG. 8 shows the internal composition of a set of VTS management information.

In the present embodiment, a video title is an image production that is expressed using (1) a Video Title Set number which is uniquely assigned to the title on the optical disc, (2) one or more sets of PGC information which show the route taken by the optical pickup in reading the optical disc, and (3) image information which is successively read from the optical disc in accordance with the PGC information. These kinds of information are managed by the title set management information for each Video Title Set. An example of such Video Title Set management information is shown in FIG. 8. As shown in FIG. 8, this Video Title Set management information is composed of a VTS internal title search pointer table, a PGC management information table, and a VTS time map table.

The PGC management information table is a table which stores a plurality of sets of PGC information. As described above, VOBs are not subjected to editing processes, so that information showing which video materials are to be extracted and reproduced in the required order is necessary. This role is fulfilled by the plurality of sets of PGC information in the PGC management information table. Here, each set of PGC information is information which, in addition to specifying the retrieval order of VOBs, specifies the various control procedures to be executed by the disc reproduction apparatus when the VOBs in question are reproduced. Examples of such control procedures are control to find a VOB (which is to be read according to PGC information) at the start of a chapter indicated by a chapter number, control to display the present reproduction time for the VOB (which is to be read in accordance with PGC information), control to find a desired image content in accordance with an indication of reproduction time, and control for performing a branch between sets of PGC information.

The order of VOBs in the sets of PGC information in the PGC management information table is expressed as a sequence of sets of VOB position information. Here, the order of position information held by sets of PGC information is interpreted by the disc reproduction apparatus as the retrieval order for VOBs. The sets of PGC information shown in the figure each have a different retrieval order for VOBs, with this showing that a plurality of video titles with different reproduction orders are achieved by having a plurality of sets of PGC information which each have rearranged position information for VOBs.

It should be especially noted here that there are branches between the sets of PGC information recorded in the PGC management information table. Here, many sets of PGC information which do not include definite information showing where branches to the present set of PGC information originate, or information showing what set of PGC information is branched to next are recorded in the Video Title Set, since these sets of PGC information feature dynamic branches where conditional branch instructions are performed in accordance with user operations made during reproduction.

The VTS (Video Title Set) internal title search pointer table is a table which is made up of title numbers, and pointers to sets of PGC information which correspond to VTS title search pointer #1, VTS title search pointer #2, VTS title search pointer #3 . . . and is a table used for referencing the sets of PGC information stored in the PGC management information table using a VTS internal title number. Here, a VTS internal title number is a locale number for managing separate titles in the Video Title Set.

FIG. 9 shows an example of the content of the VTS internal title search pointer table. As shown in this figure, the VTS internal title search pointers #1, #2, and #3 are respectively made up of a Video Title Set number and VTS internal title number (this pairing corresponding to the title number assigned to one of titles), and a number (PGC number) of a set of linked PGC information.

The sets of PGC information which are linked to the VTS internal title numbers in VTS internal title search pointers #1, #2, and #3, are sets of PGC information which are specified by a selection operation made by the user. These sets of PGC information are somewhat exceptional when compared to other PGCs, which are stored without information showing the origins of branches, in that they are specified by a clear operation made by the user after referring to the available title names. As a result, these sets of PGC information are appended with the label "Entry-PGC" to distinguish them from other sets of PGC information.

In the VTS internal title search pointer of the present embodiment, there are the differences described below for sets of entry-PGC information which correspond to title numbers.

In the present embodiment, titles recorded on an optical disc are made up of titles which the developer has had recorded in a sequential order from the opening scene to the ending scene (called "sequential titles", see species (1) in FIG. 1), multi-story titles which dynamically change in accordance with the user operations which are performed during reproduction (see species (6) in FIG. 1), and quiz-style titles where the same scenes can be shown several times or rearranged into random order (see species (2) in FIG. 1).

The Entry-PGC information for a sequential title, of which is PGC information #1 is an example, indicates all of the VOBs from the opening scene to the ending scene. This is to say, the linked construction of VOBs is sequential. The VOB position information in such a set of Entry-PGC information contains all of the scenes, so that the VOB used in the reproduction of a play, for example, can be indexed with chapter numbers (Act numbers), which allows the user during reproduction to specify a desired scene using such chapter numbers. Since the order of VOBs from the opening scene to the ending scene is decided, it is possible by counting the sets of VOB position information using the Entry-PGC information to have a reproduction present time displayed along with a present chapter number on a panel provided on the disc reproduction apparatus.

The Entry-PGC information for a multi-story title (such as PGC information #5) only indicates the VOB for the opening scene, so that once the opening scene has been reproduced, the disc reproduction apparatus executes a conditional branch. This conditional branch is an instruction which indicates a switch to a branch destination set of PGC information in accordance with a user operation made during reproduction. By having the disc reproduction apparatus perform this kind of branch, a dynamic switch to a next scene is performed following the reproduction of the first scene.

Multi-story titles are interactive titles for which emulated AV functions are prohibited. This is because interactive titles are titles which are reproduced in accordance with user selections made using menus, so that it is necessary for all of the scenes which are not indicated by a user operation to be concealed. It is also technically difficult to assign consecutive numbers to the image data which is read for interactive titles. Here, if a producer attempts to establish a correspondence relationship, the correspondence between chapter numbers and scenes, and between the reproduction time and scenes will become jumbled up, which will only confuse the viewer.

The Entry-PGC information in a quiz-type title (such as PGC information#3), indicates all of the VOBs from the opening scene to the ending scene in the same way as with a sequential title, although the Entry-PGC information further contains an indication that the image scenes will be selected and reproduced in a random order, so that the order of VOBs indicated by this set of PGC information is kept secret from the user. In order to prevent the user from finding out this the image content and order of image scenes by activating a chapter search or time search, the activation of emulated AV functions is prohibited.

In FIG. 8, "VTS time search map #1–#12" is information which shows by how many seconds the reproduction time display is updated when the optical pickup is advanced by a given amount during a scanning of the optical disc by the optical pickup based on any of the sets of PGC information. Accordingly, the time search map is composed of a group of time updating points which will be passed by the optical pickup when scanning the optical disc. This group of time updating points is a group of addresses which are at intervals on the optical disc that correspond to time resolution. Here, time resolution refers to the notch width which is used for reproduction time display, so that if, for example, this is one second, the time search map is composed so that time updating points are arranged at intervals of two VOBU. If this notch width is three seconds, the time search map is composed so that time updating points are arranged at intervals of six VOBU, since each VOBU corresponds to a reproduction time of around 0.5 seconds. Here, VTS time search maps #1–#12 shown in FIG. 8 are all composed for PGC information #1, since out of the sets of PGC information #1–#6 in FIG. 9, a feedback function is only possible for PGC information #1 that is set as the Entry-PGC of the sequential title.

(1.1.1.2.1) Video Title Set Management Information-PGC Information

The following is an explanation of the data construction and the detailed content of the PGC information #1, #2, #3 . . . #6 in the PGC management information table. Here, FIG. 10A shows an example of the PGC information management table. As shown in this figure, PGC information #1, #2, #3 . . . #6 have a common aspect in that they are all generated with the data format shown in FIG. 10B as a template, although they each differ in content.

The VOB position information table uses sequences of VOB position information to indicate to the disc reproduction apparatus what VOBs should be read in what order for the present set of PGC information. Each set of VOB position information shows to the disc reproduction apparatus the storage position of each VOB on the optical disc, so that the disc reproduction apparatus can have the optical pickup scan that storage position. As shown in FIG. 10C, each set of VOB position information in the present embodiment is expressed using as a "VOB reproduction time", a "VOB offset", and a "No. of blocks in VOB". When reading a VOB, the disc reproduction apparatus uses the offset numbers included in the VOB position information and calculates the logical block number of the logical blocks in which the VOB is stored, before having the optical pickup scan only the number of logical blocks indicated by the "No. of blocks" on the track of the optical disc.

The PGC link information is information which shows what reproduction route continues after the present logical block, and stores link destination information which shows what set of PGC information should be next read into the buffer. When the reproduction according to one set of PGC information is completed by the disc reproduction apparatus, the next set of PGC information is determined in accordance with the "PGC link information", and this next set of PGC information is read from the disc and overwritten into the buffer. In this way, the PGC information is updated and reproduction control can continue in accordance with the reproduction route indicated by this updated set of PGC information. Here, for the example shown in FIG. 10A, only PGC information #2 includes a branch destination (PGC information #13), with the PGC link information of the other sets of PGC information being set at "NULL". This means that only PGC information #2 has a fixed link destination.

The PG map is information which shows how VOBs to be reproduced by the present PGC information are grouped together into chapters, and has a data construction in the form of a table which shows the correspondence between the plurality of PG numbers indicated by the arrow a10, and the entry VOBS. Here, a PG (program) is a collection of the plurality of VOBs given in reproduction order by the present PGC information which are grouped together in a single chapter, with an entry VOB being a VOB positioned at the start of a PG.

As one example, PGC information#10 sets a reproduction order to nine VOBs which are numbered VOB#1, #2, #3, #4 . . . #9, with VOB#1 being set as the entry VOB for chapter number PG1, VOB#3 being set as the entry VOB for chapter number PG2, and VOB#6 being set as the entry VOB for chapter number PG3. By doing so, VOB#1 and #2 are grouped together into chapter PG1, VOB#3 to #5 are grouped together into chapter PG2, and VOB#6 to #9 are grouped together into chapter PG3. When a chapter number is directly inputted into the disc reproduction apparatus via a remote controller or a control panel, the PG number for the indicated chapter number is found, and retrieval is commenced starting from the Entry VOB of the corresponding PG number.

For the example shown in FIG. 10A, an entry VOB for a chapter number are only written in PGC information #1, with "NULL" being written into PGC information #2, #3, #4, #5 and #6. This is because of the premise that the search operations using chapter numbers are performed using only PGC information #1.

The PGC standard information is made up of the number of repetitions, which shows the number of times the sequence of VOBs written in the VOB position information is repeatedly retrieved, and a flag which shows whether the VOBs are randomly selected during this repetitive retrieval.

For the example shown in FIG. 10A, "5Loop Random" and "3Loop Random" are written in PGC information #3 and PGC information #4, respectively, with "NULL" having been written in the other sets of PGC information. Here, "Random" is attribute information which is an indication for random retrieval. If the standard information is set as described above, the retrieval of the VOBs indicated by the VOB position information of PGC#3 is performed five times, with the VOB to be retrieved in these five repetitions being randomly selected.

The PGC command table stores various kinds of commands which include conditional branch commands which are added to the "VOB position information table". By executing the commands which are written here before and after the retrieval of VOBs based on the VOB position information table, the disc reproduction apparatus can perform a more dynamic switching of reproduction routes.

The conditional branch commands shown in the present figure are expressed as comparisons to see whether the values of general registers and immediate values are equal or higher/lower, with the branch destinations being expressed as PGC numbers. Here, general registers are registers for storing values in accordance with operations made by the user during reproduction, and are used to inform the disc reproduction apparatus of user operations which have been made using a remote controller or a control panel.

For the example shown in FIG. 10A, a PGC command table has been written into PGC information #5 and PGC information #6, while the word "NULL" has been written into each of PGC information #1 to #4. This shows that for PGC information #5 and #6, determination of a branch destination is based on commands.

The PGC command table of PGC information #5 stores "CmpRegLink R1, 3, "=", PGC#15" and "CmpRegLink R1,4,"=", PGC#16". The former of these commands shows that the PGC information #15 is selected as a branch destination when the stored value of the general register R1 inside the disc reproduction apparatus is equal to "3". In the same way, the latter of the commands shows that the PGC information #16 is selected as the branch destination when the stored value of the general register R1 inside the disc reproduction apparatus is equal to "4".

The PGC command table of PGC information #6 stores "Title Play Title#5" which indicates that the title of title number #5 is the branch destination of PGC information #6.

(1.1.2) Logical Construction-Video Manaqer

The Video Manager is made up of VTS internal title search pointers, video objects, and sets of PGC information, with it being possible for its data construction to be standardized to that of the Video Title Set (although it should be obvious that it is far more simplified than that of the Video Title Set). The difference between the VOBs for the Video Manager and the VOBs for the Video Title Set lies in the fact that the Video Manager is used exclusively for reproducing the volume menu. Here, the expression "volume menu" refers to a menu in which all of the titles stored on the optical disc are recorded, so that when the volume menu is displayed, the user can select one of the titles. When an optical disc is loaded into the disc reproduction apparatus, this volume menu is displayed on the screen immediately after the optical pickup has moved from the volume management area to the file area.

Since the Video Manager is only used for the volume menu, there are the following two differences between the Video Manager and the Video Title Set. Firstly, while the VOBs in the Video Title Set include video data for actual footage, sub-picture data and audio data, the VOBs in the Video Manager only contain a video pack, a sub-picture pack and a management information pack for a background image for a menu. Secondly, the branch destinations of the branch commands in the PGC information and the management information of the Video Title Set, with certain exceptions, do not exceed the range of the Video Title Set, while the branch commands in the Video Manager have branch addresses for titles in a variety of Video Title Sets on the optical disc, so that they can cross over between Video Title Sets.

The most significant characteristic of the Video Manager is that it is loaded into a memory provided in the disc reproduction apparatus for the duration that the optical disc is loaded in the disc reproduction apparatus. By having the Video Manager stored in memory in this way, the disc reproduction apparatus can refer to the content of the Video Manager without performing a disc access operation.

FIG. 11 shows the data construction of the Video Manager. As shown in this figure, the Video Manager is composed of "VOBs for menu", "menu PGC information", and a "VM internal title search pointer table".

Figure 12:
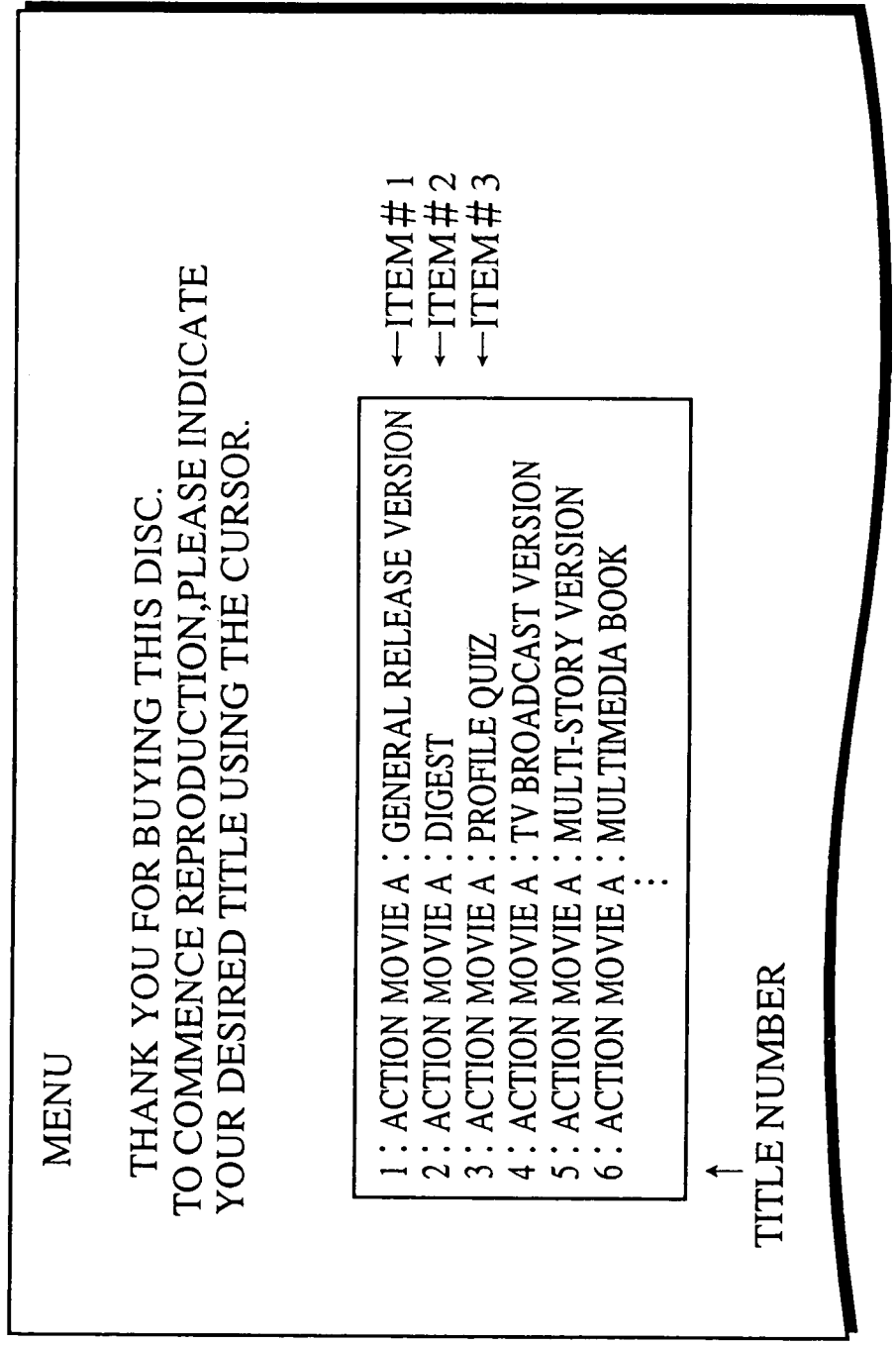
FIG. 12 shows an example of a volume menu.

The "VOBs for menu" are VOBs which are specially used for the volume menu. As their name suggests, they include the sub-picture pack for displaying the volume menu and the management information pack for performing reproduction control in accordance with cursor operations and confirmation operations. The display image for a volume menu is shown in FIG. 12. The VOB for the volume menu includes a sub-picture pack in which character strings showing the titles have been subjected to run-length encoding, the titles being "Action movie A: General release version", "Action movie A: Digest", "Action movie A: Profile Quiz", "Action movie A: TV broadcast version", "Action movie A: Multi-story version", and "Action movie A: Multimedia book". The user selects one of these title name character strings and performs a confirmation operation to indicate the title to be reproduced. Here, the management information pack in the same VOB includes a same number of sets of item information as there are titles, as shown in FIG. 13. These sets of item information store a "Title Play" command which indicates a branch to each title number and a "palette conversion range" which shows the area on the display whose color will change when the corresponding item is in the selection condition.

The set of "menu PGC information" (shown as PGC information for Menu in the drawings) is a set of PGC information which is exclusively used for the volume menu, and stores the recording position of the corresponding menu VOB so that the menu VOB can be read when the optical disc is loaded into the disc reproduction apparatus. This set of PGC information is read by the disc reproduction apparatus immediately after the disc has been loaded in the disc reproduction apparatus and the optical pickup has moved from the volume management area to the file area, and is used to guide the optical pickup so as to read the menu VOB. In this way, the volume menu can be displayed on the screen.

The VM internal title search pointer table is made up of a plurality of VM internal title search pointers #1 . . . #99 which each correspond to a title number. An example of this table is shown in FIG. 14. In this figure, the VM internal title search pointer #1 corresponds to title number 1, with VM internal title search pointers #2 and #3 respectively corresponding to title numbers 2 and 3.

VM internal title search pointer #1 includes a pairing of a Video Title Set number and a VTS internal title number, in addition to a "title playback type". Here, a "title playback type" is information for immediately informing the disc reproduction apparatus, when a selection has been made from the volume menu, of the classification of the corresponding title in the VM title search pointer table.

Here, the disc reproduction apparatus is informed of the species type into which the selected title has been classified immediately after the title is selected from the volume menu, since it is too late to have such classification established after reproduction of the title has started. This is necessary in order to have the disc reproduction apparatus perform a certain process in a very short period of time. This process is the recognition by the disc reproduction apparatus of whether emulated AV functions are possible. This recognition needs to be performed in such a short time since it is necessary to have present reproduction time "00:00:00" and chapter number "00" displayed on the panel provided on the disc reproduction apparatus immediately after the user has loaded the optical disc into the disc reproduction apparatus and has performed a title selection operation. This is also necessary since there is the possibility of the user attempting to perform a chapter search operation and time search operation immediately after performing the title selection operation.

If, on the other hand, the recognition of whether to perform emulated AV functions takes is too slow, it will not be completed within the short period of time described above, so that the display of the present reproduction time "00:00:00" and the chapter number "00" will not be made in time for the start of reproduction, or the disc reproduction apparatus will not be able to respond to chapter search operations and time search operations made for a title immediately after title selection.

Here, in order to determine whether emulated AV functions are possible for a title, it is necessary to recognize the classification to which the selected title belongs. The recognition of this classification is made by determining the "number of sets of route information", the "presence of loops", and the "presence of automatic branches", which is performed by judging whether there is any link destination PGC information in the link PGC information, whether there is any conditional branch information in the PGC command table, and whether there are any loop attributes in the PGC standard information. However, since the sets of PGC information are distributed within the Video Title Set management information of each Video Title Set, it is necessary for the disc reproduction apparatus in making this judgment to write into memory the management information of the Video Title Set which stores the title that has been selected by the user. If such access to the Video Title Set is necessary, then the display of the present reproduction time "00:00:00" and the title search number "00" will be delayed by the time taken by this access.

Also, to properly determine the "presence of branches", it is necessary to check that no branch commands are present in any of the PCI packets in the large number of management information packs which compose one VOB. However, since the size of each VOB is in the region of several megabytes, it is extremely difficult to perform this checking of management information packs in a very short period of time.

In view of these problems, a "title playback type" which classifies each title into one of the groups is provided beforehand in the VM internal title search pointer table, so that the disc reproduction apparatus can be informed, as soon as a title is selected, of the group to which the selected title belongs.

The title playback type includes a plurality of flags for showing the format of the various titles. The reference numerals 9141, 9142, and 9143 shown in the figures indicate the "sequential single PGC identification flag", the "no branch flag" and the "no branch between titles" flag, with these flags being set at "On" or "Off" to indicate the format of each title.

When the "single sequential PGC identification" flag is "On", the title selected by the user is expressed by only one set of PGC information which indicates all of the VOBs from the opening scene to the ending scene. When it is "Off", the VOBs from the opening scene to the ending scene are expressed by several sets of PGC information or loop information indicating that the set of VOBs are repeatedly read a number of times is included in the PGC standard information. For the example shown in FIG. 14, the "sequential single PGC identification" flag is only "On" for the VM internal title search pointer #1, with the "Off" state of the "sequential single PGC identification" flag for the VM internal title search pointers #2 and #3 showing that out of the title names displayed in the list in the volume menu, only the "Action movie A: General release version" of title number 1 is expressed by one set of PGC information indicating all of the VOBs from the opening scene to the ending scene.

When the "no branch" flag is "On", this shows that there are absolutely no branch commands for branching to another set of PGC information in either the PGC command field of the PGCs included in the title, or in any of the hundreds or thousands of management information packs in the VOBs of several megabytes in length which are indicated in the retrieval order shown in the sets of PGC information for the title. For the example shown in FIG. 14, the "no branch" flag is "Off" for VM internal title search pointers #2 to #9, while the "no branch" flag is "On" for VM internal title search pointer #1. This arises since for the case of video title "Action movie A: General release version" corresponding to VM internal title search pointer #1, PGC information #1, which is the Entry-PGC information for Video Title Set V1, does not contain any branch commands in its PGC command field or link information, and none of the VOBS whose retrieval is specified by the VOB position information include branch commands.

For VM internal title search pointer #5, on the other hand, the "no branch" flag is "Off", since the video title "Action movie A: multi-story version" corresponding to VM internal title search pointer #5 has Entry-PGC information, PGC information #5, in Video Title Set V1 which includes a conditional branch command whose execution depends on the stored value of register R1.

It should be noted here that while the present description deals with the case when one flag is used to indicate the presence (or not) of branches, a plurality of flags which correspond to different kinds of branches may be used. Here, these "different kinds of branches" refers to branches which are performed in response to confirmation operations by the user and to branches which are automatically performed regardless of such confirmation operations. The former kind of branches are called "manual branches", and the latter kind are called "automatic branches". If this is the case, titles for which there are absolutely no conditional branch commands (which indicate a branch to another set of PGC information in accordance with a confirmation operation for an item) in the PGC command field of the PGC information or in the very many management information packs in the VOBs in the retrieval order given in the PGC information have a "no manual branch" flag set at "On".

In the same way, titles for which there are absolutely no automatic branch commands (which indicate an automatic branch to another set of PGC information) in the PGC command field of the PGC information or in the very many management information packs in the VOBs in the retrieval order given in the PGC information have a "no automatic branch" flag set at "On".

By creating the above distinction using the "no manual branch" flag and the "no automatic branch" flag, the route construction of titles can be more described more precisely.

The "no branch between titles" flag is a flag for showing whether any branches to another title occur during the reproduction of a title, aside from when a title number is selected. More specifically, the "no branch between titles" flag guarantees that the command fields in the items of the management information packs and the command fields in PGC information definitely do not contain any branch instructions which branch to another title.

(2.1) Outline of the Disc Reproduction Device

Figure 15:
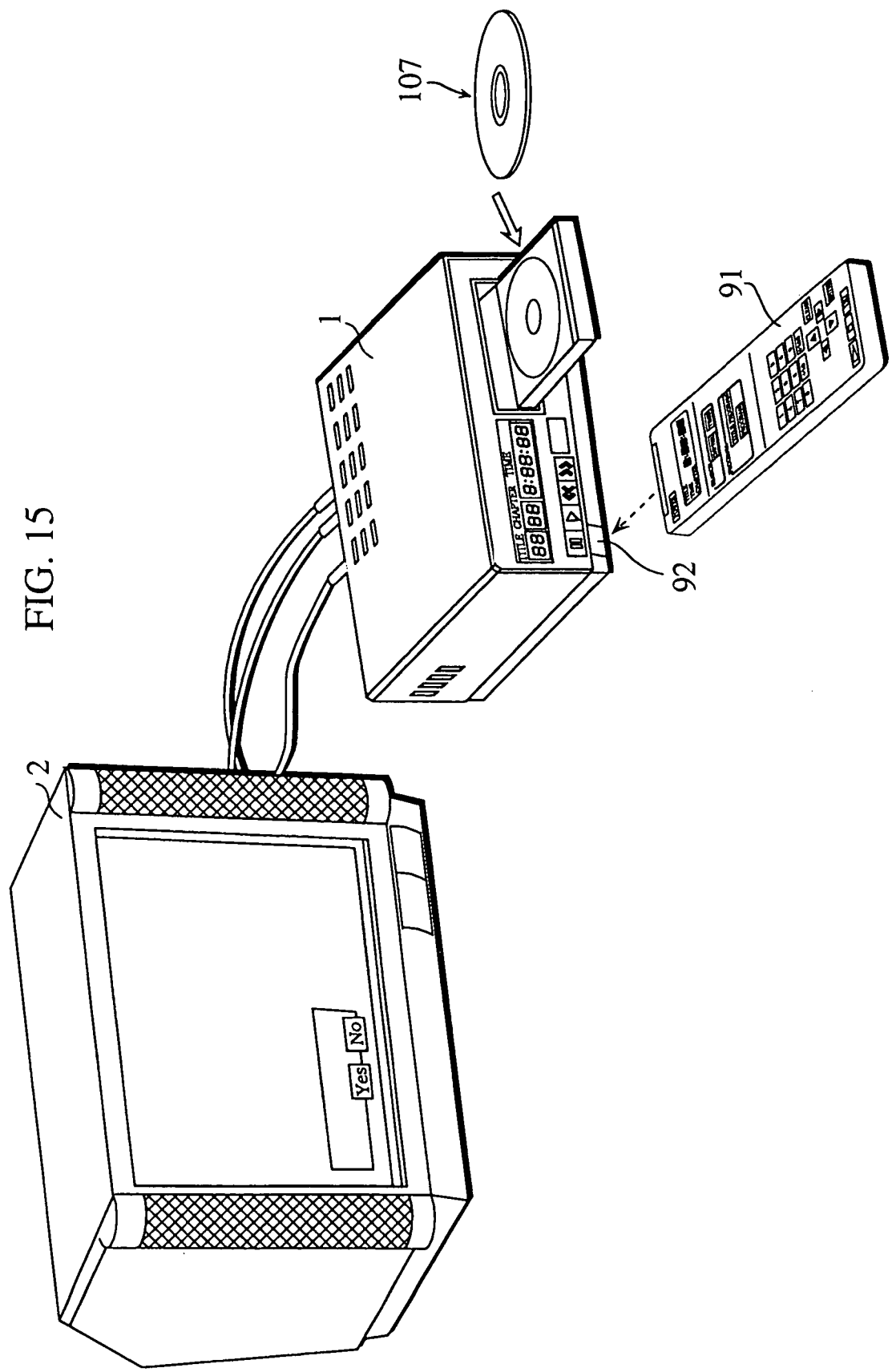
FIG. 15 shows a perspective view of the reproduction device of the present embodiment.

The following is an explanation of the disc reproduction apparatus of the present invention. In general, disc reproduction apparatuses can be classified into two types which are low-cost players, which are equipped with low capacity memories and whose processing speed is slow, and professional players, which are equipped with large memories and whose processing speed is on a par with specialized equipment. In this embodiment, an example of a low-cost player is described. A perspective drawing in of this low-cost player (hereinafter referred to as DVD player 1), a television monitor 2, and a remoter controller 91 is shown in FIG. 15.

DVD player 1 has an opening in the front of its case and has a drive mechanism where a disc is inserted provided inside this opening.

A remote control receiving unit 92, which includes detecting elements for detecting the infra-red signals emitted by the remote controller 91, is provided on the front of the DVD player 1, so that when the user makes an operation with the remote controller 91 in his/her hand, the remote control receiving unit 92 generates an interrupt signal which indicates the inputted key.

A video output terminal and an audio output terminal are provided on the back of the DVD player 1, so that when these terminals are connected to a standard large-screen (33- or 35-inch) television using AV leads, a video signal read from a DVD can be enjoyed by the user. As can be understood from the above description, the DVD player 1 in the present embodiment is not connected to a personal computer, and is instead a standard domestic appliance which is to be used with a television as a monitor.

Figure 16:
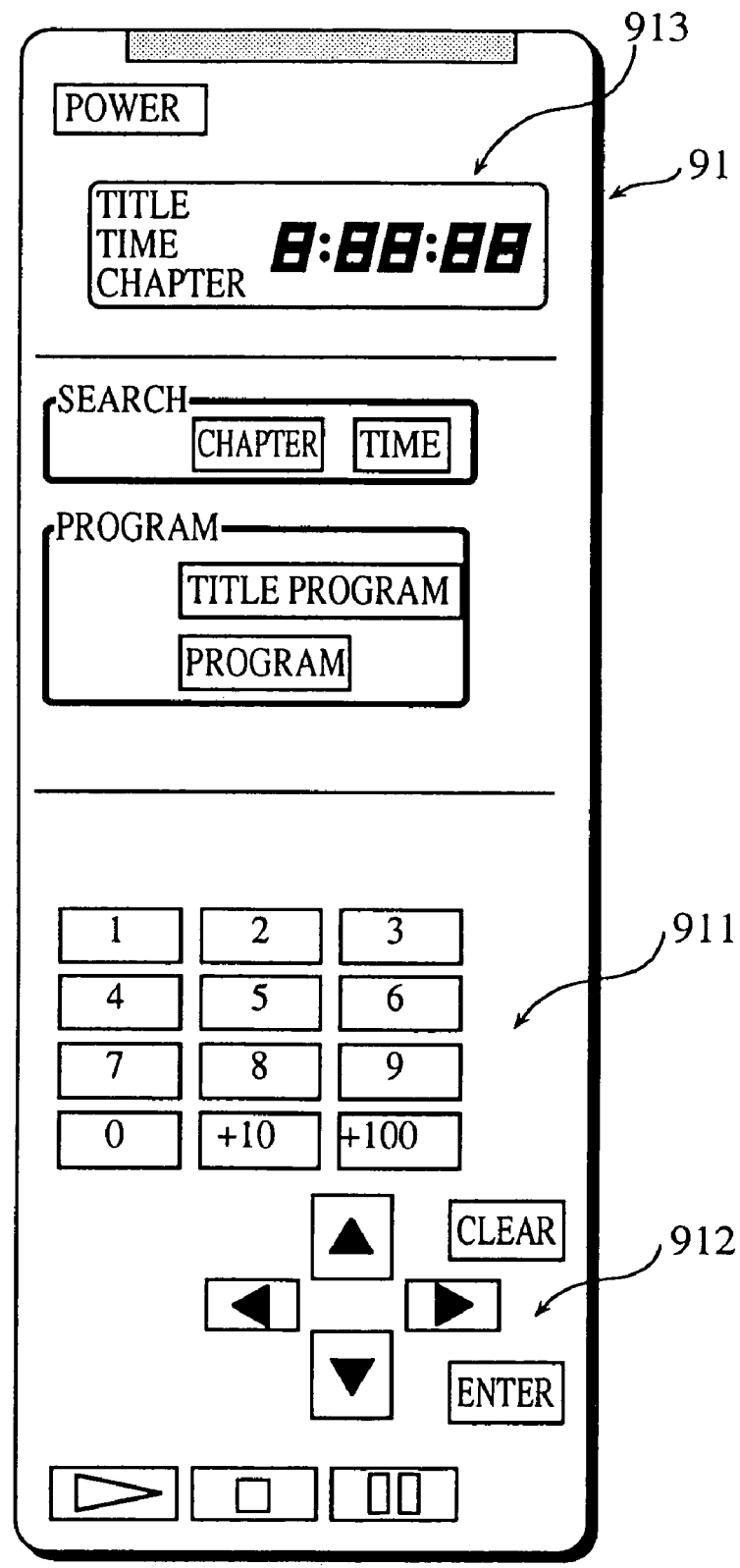
FIG. 16 shows an example of the key arrangement of the remote controller 91.

The remote controller 91 is used for receiving user operations. An example of the key arrangement on the remote controller 91 is shown in FIG. 16. Here, the ten key 911 is used in combination with the other keys for numerical input. The cursor keys 912 arranged in a cross area used for changing the selected item. The "ENTER" key is used for performing the confirmation of selections. To make a search indication, the "CHAPTER" or "TIME" keys is pressed, the numerical input becomes possible and a numerical input made using the ten key 911 is displayed on the display unit 913. If the user presses the "CHAPTER" or "TIME" key again, a time or chapter search is performed in accordance with the user indication. The "TITLE PROGRAM" key and "PROGRAM" key are also provided for indicating program reproduction, with a pressing of these keys also making numerical input possible, so that if a number showing the reproduction order is inputted using the ten key and a same program key is pressed, the reproduction command is confirmed. Using the "TITLE PROGRAM" key, the user can indicate programmed reproduction for a title, while the "PROGRAM" key is used to indicate programmed reproduction for a chapter. As one example, if the user presses the "TITLE PROGRAM" key and the reproduction order "3", "4", "2" using the ten key, title number "3", title number "4", and title number "2" are reproduced in that order.

(2.2) Construction Elements of the Disc Reproduction Device

Figure 17:
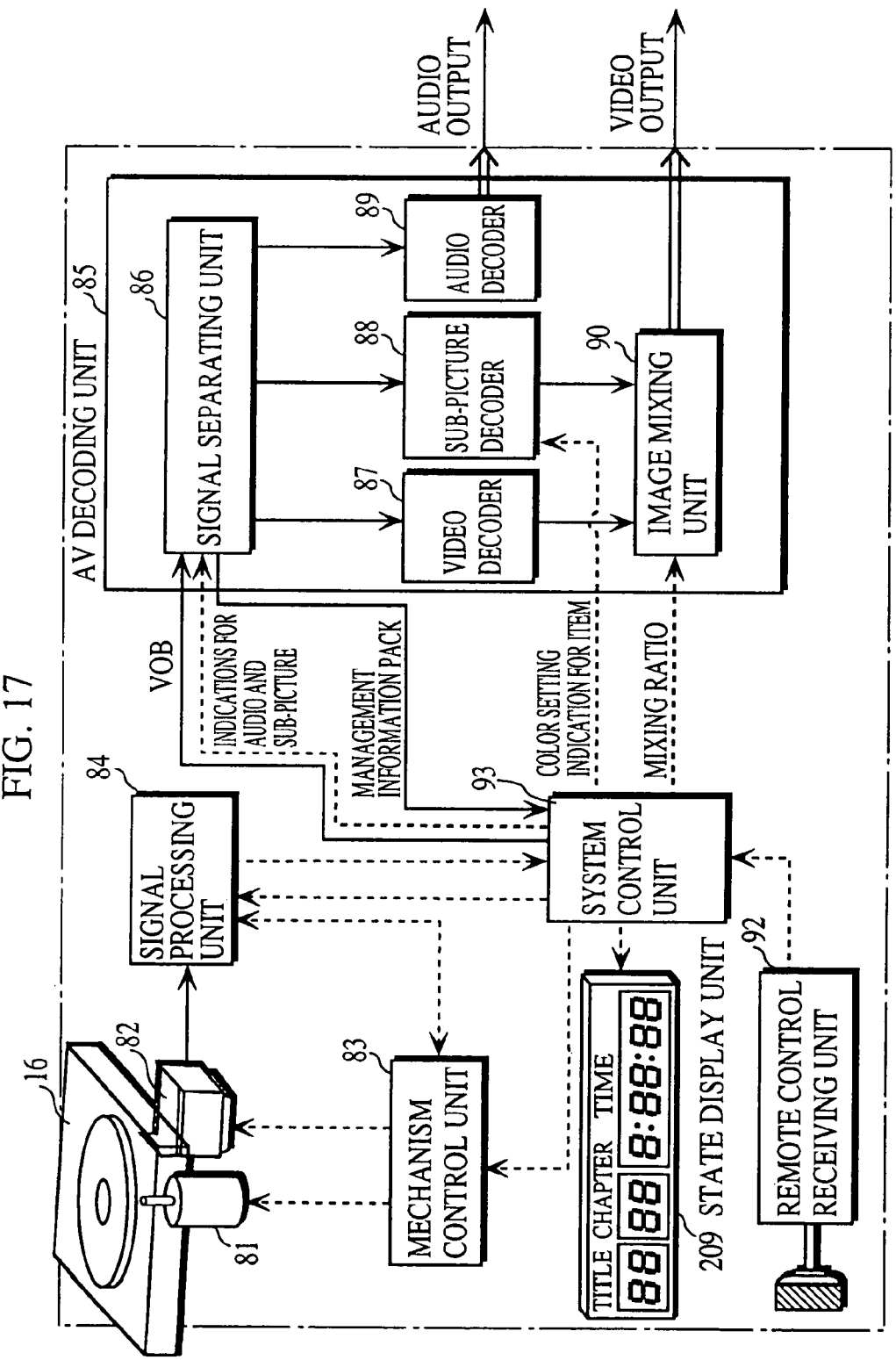
FIG. 17 is a block diagram of the internal construction of the DVD player 1 of the present invention.

FIG. 17 is a block diagram showing the construction of the DVD player used in the present embodiment. The DVD player includes a drive mechanism 16, an optical pickup, a mechanism control unit 83, a signal processing unit 84, an AV decoding unit 85, a remote control receiving unit 92, and a system control unit 93. AV decoding unit 85 comprises a signal separating unit 86, a video decoder 87, a sub-picture decoder 88, audio decoder 89, a state display unit 209, and a picture mixing unit 90.

The remote control receiving unit 92 receives a key signal which is infra-red transmitted when in a key on the remote controller 91 is pressed, and generates in interrupt signal showing the pressed key to notify the system control unit 93 of the pressed key as a "reception instruction". Here, the kinds of reception instructions which can be used to notify the system control unit 93 include start reproduction instructions, stop reproduction instructions, button selection instructions, button confirmation instructions, chapter search instructions for an indicated chapter number, time search instructions for an indicated time, chapter program instructions including a reproduction order indication for chapters, and title program instructions including a reproduction order indication for titles.

The state display unit 209 is a display unit which is composed of a liquid crystal panel, or the like, that is provided on the front of the DVD player 1. The state display unit 209 controls the liquid crystal display in accordance with the indications from the system control unit 93, so as to display the title number of the title being reproduced, the chapter number, and the present reproduction time. On receiving a display invalidating signal from the system control unit 93, the state display unit 209 terminates the display of title number, chapter number and reproduction time. Here, it should be also noted that it is also possible for the state display unit 209 to be constructed to display only one of title number, chapter number, and reproduction time.

The drive mechanism 16 comprises a platter on which an optical disc is placed and spindle motor 81 for rotating the inserted optical disc. The platter can be moved in and out of the DVD player by means of an eject mechanism which is not shown in the drawing. The user places an optical disc on the platter when it has been projected forward outside the DVD player. After this, the platter is moved back into the DVD player so as to load the optical disc.

The mechanism control unit 83 controls the spindle motor 81 for rotating the disc and the mechanism made of the optical pickup for reading the signal from the disc and actuator 82 of the optical pickup. Specifically, the mechanism control unit 83 adjusts the motor speed according to a track position specified by system control unit 93. At the same time, it moves the optical pickup by controlling the actuator 82 of the pickup and, having detected a correct track by servo control, waits for a desired physical sector before reading signals continuously starting from a desired position.

The signal processing unit 84 converts the signals read using the optical pickup into a sequence of digital data while performing various processes such as amplification, waveform shaping, conversion to binary, demodulation, and error correction. It then stores the processed data in a buffer memory inside the system control unit 93 in logical block units.

The AV decoding unit 85 applies certain processes to the digital data inputted as VOBs and converts them into the video signals and audio signals.

The signal separating unit 86 receives the digital data transferred from the buffer memory in units of logical blocks (packets), and classifies the data into packs of management information data, video data, sub-picture data, or audio data by identifying the stream ID and sub-stream ID of each packet. The signal separating unit 86 outputs video data to the video decoder 87, audio data to the audio data decoder 89, and sub-picture data to the sub-picture decoder 88. The signal separating unit 86 also outputs management information packs to the system control unit 93. When such data is outputted, the system control unit 93 indicates numbers to the signal separating unit 86, with, as shown in FIG. 6, these number indicating one set of audio data (A, B, or C) and one set of sub-picture data (A or B). On receiving these indications from the system control unit 93, the signal separating unit 86 outputs only the data on the specified channels to the audio decoder 89 and the sub-picture decoder 89. The data on the other channels is discarded.

(2.2.1) Disc Reproduction Device . . . Construction of Signal Separating Unit 86

Figure 18:
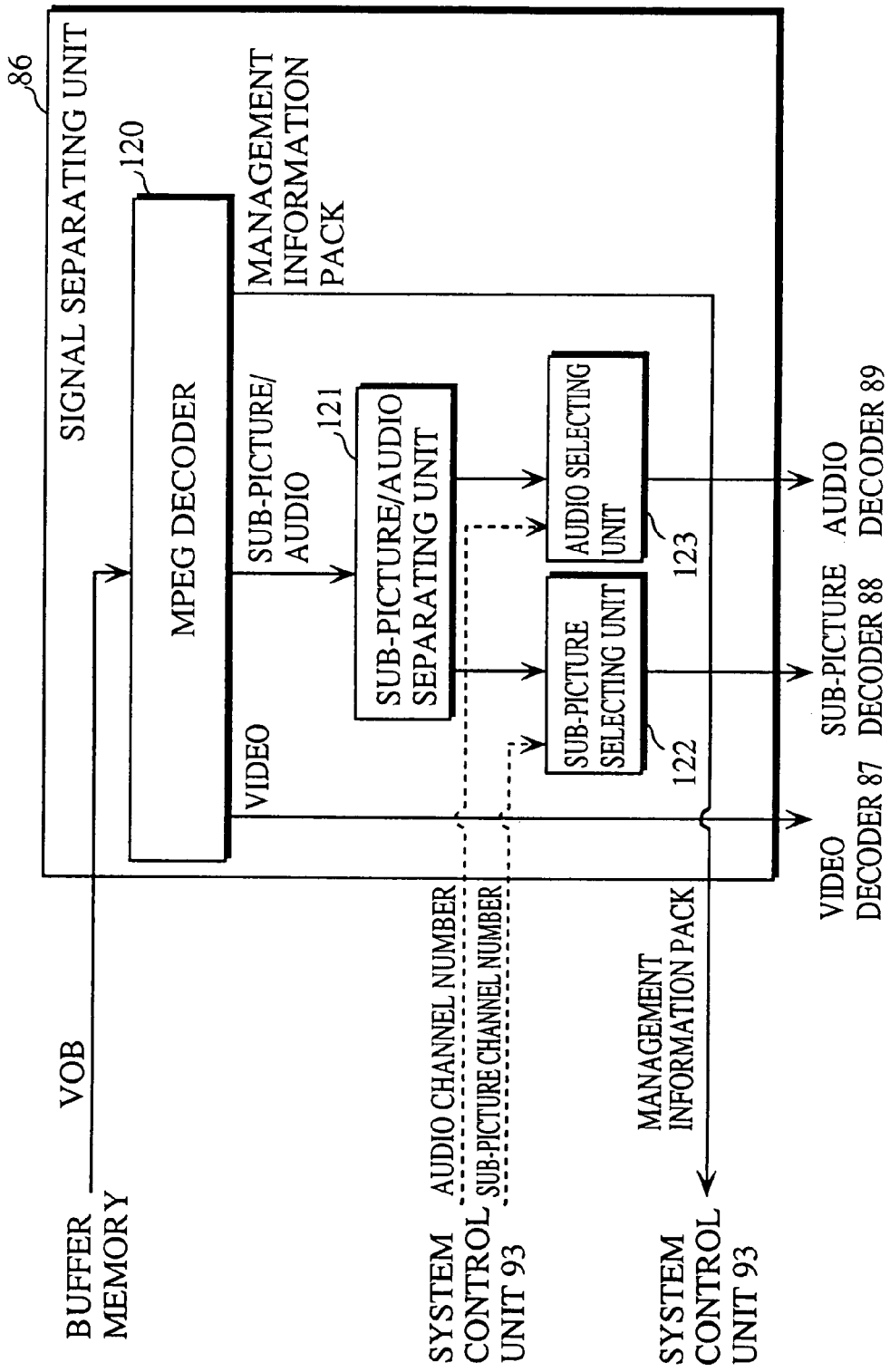
FIG. 18 is a block diagram showing the composition of the signal separating unit 86.

FIG. 18 is a block diagram showing the construction of the signal separating unit 86. As shown in the drawing, the signal separating unit 86 comprises an MPEG decoder 120, a sub-picture/audio separating unit 121, a sub-picture selecting unit 122, and an audio selecting unit 123.

The MPEG decoder 120 determines the types of packs transferred from the buffer memory by checking the stream IDs and outputting the packets as follows. If the stream ID is "1110 0000", the MPEG decoder 120 outputs the packet to the video decoder 87. If the stream ID is "1011 1101", the MPEG decoder outputs the packet to the sub-picture/audio separating unit 121. Alternatively, if the stream ID is "1011 1111", the MPEG decoder 120 outputs the packet to the system control unit 93.

The sub-picture/audio separating unit 121 outputs the packets input from the MPEG decoder 120 to the sub-picture selecting unit 122 if their sub-stream ID is "001* **" or to the audio selecting unit 123 if their sub-stream ID is "1010 0*". As a result, each set of sub-picture data and audio data is appropriately output to either the sub-picture selecting unit 122 or the audio selecting unit 123.

The sub-picture selecting unit 122 outputs the sub-picture data on the channel number specified by the system control unit 93 to the sub-picture decoder 88 and discards the rest of the sub-picture data. If, as in the example of FIG. 6, sub-picture materials for channels A and B are respectively English and French subtitles, then a specification of channel A by the system control unit 93 will result in the sub-picture selecting unit 122 outputting the sub-picture data on channel A to sub-picture decoder 88, with the sub-picture data on channel B being discarded. As a result, the sub-picture decoder 88 decodes only the English subtitles.

The audio selecting unit 123 outputs the audio data on the channel number specified by system control unit 93 to the audio decoder 89 and discards the rest of the audio data. If, for the example shown in FIG. 6, the audio material on channels A, B, and C are English, French, and Japanese soundtracks, then a specification of channel A by the system control unit 93 will result in the audio selecting unit 123 outputting the audio data on channel A to the audio decoder 89, with audio packets B and C being discarded. As a result, the audio decoder 89 decodes only the English soundtrack, The video decoder 87 decodes and decompresses the video data sent from the signal separating unit 86, before outputting the data to the picture mixing unit 90 as a digital video signal.

The sub-picture decoder 88 decodes and decompresses the sub-picture data sent from the signal separating unit 86 if the sub-picture data is image data compressed with run-length compression, and outputs the sub-picture data to the picture mixing unit 90 in the same format as the video signals. Here, if the image data is provided with a plurality of items and the user moves the cursor between these items, the system control unit 93 instructs the sub-picture decoder 88 to change the color of the image data in question. Such color changing indications are outputted based on the item color information recorded in the Highlight information, so that the display of items can be changed to the selection color or the confirmation color. Here, movement of the cursor among these items is displayed to the user by changing the selection color and confirmation color.

The description of the construction of the DVD player 1 continues with reference to FIG. 17. The audio decoder 89 decodes and extends the audio data sent from signal separating unit 86 before outputting digital audio signal.

The picture mixing unit 90 outputs a video signal after mixing the outputs from video decoder 87 and sub-picture decoder 88 according to the ratio specified by system controlling unit 93. This mixing ratio is determined based on the contrast given in the item color information in the Highlight Information, and can be changed for each GOP unit. The picture signals are converted to an NTSC (National Television System Committee) video signal which is then inputted into the TV monitor 2.

(2.2.2) Disc Reproduction Device . . . Construction of System Control Unit 93

Figure 19:
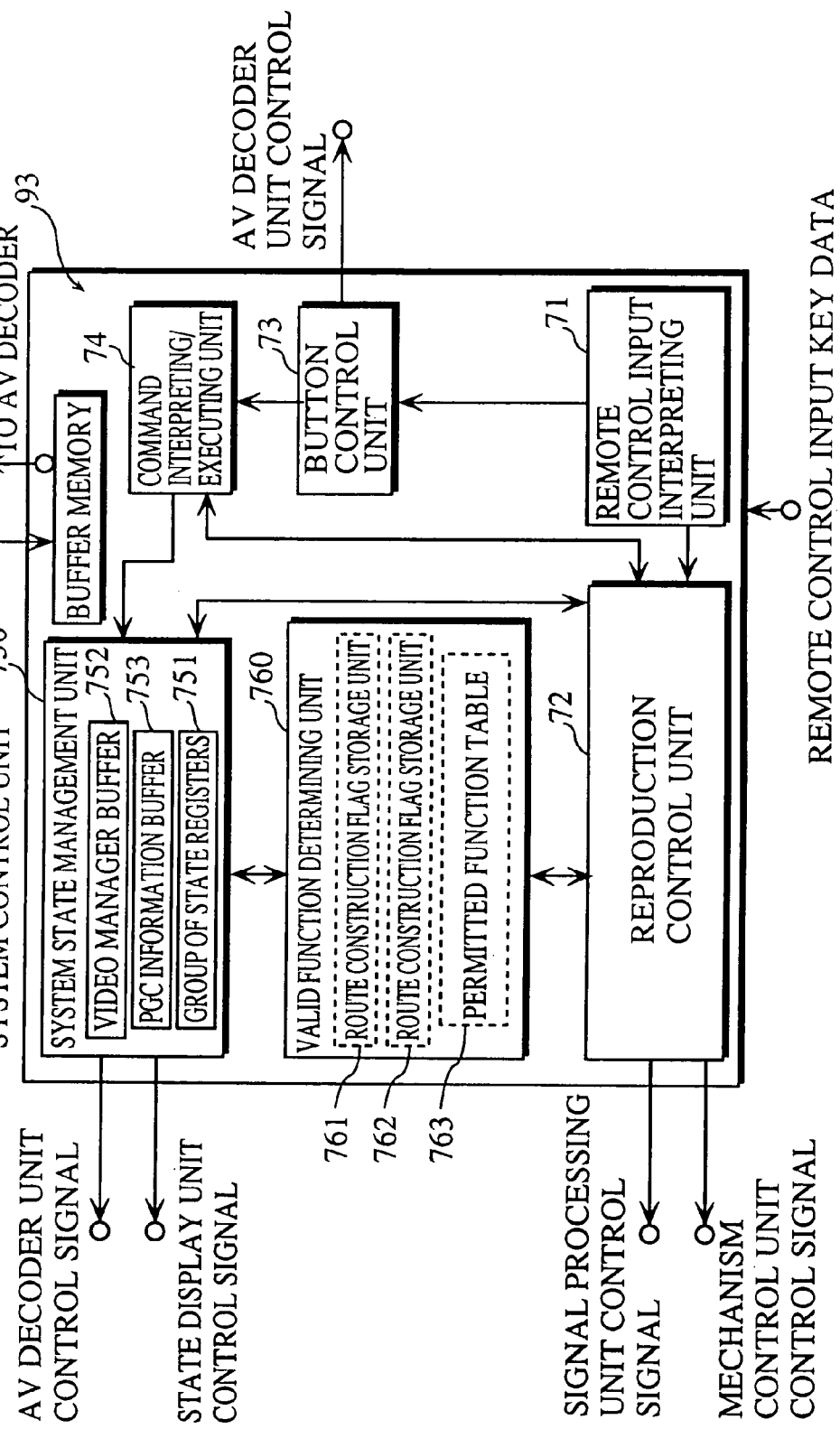
FIG. 19 shows the internal construction of the system control unit 93.

The following is an explanation of the internal construction of the system control unit 93 which is shown in FIG. 19. As shown in the figure, the system control unit is made up of a remote control input interpreting unit 71, a reproduction control unit 72, a button control unit 73, a command interpreting/executing unit 74, a buffer memory 94, a system state management unit 750, and a valid function determining unit 760.

The buffer memory 94 is used for storing the data which has been subjected to the various processes such as amplification, waveform shaping, conversion to binary, demodulation, and error correction. If the data written into the buffer memory 94 is Video Title Set management information, it is written into another buffer which is not illustrated. On the other hand, if the data is a VOB, the system control unit 93 transfers the data one pack at a time to the signal separating unit 86. By when VOBs are transferred in this way, the management information packs will be sent back from the AV decoder unit 85.

The remote controller input interpreting unit 71 interprets the remote control key data received by the remote control receiving unit 82. This interpreted remote control key data can be a start reproduction instruction, a stop reproduction instruction, button selection instruction, a button confirmation instruction, a chapter search instruction for an indicated chapter number, a time search instruction for an indicated time, a chapter program instruction including a reproduction order indication for chapters, or a title program instruction including a reproduction order indication for titles. Of these, button selection instructions and button confirmation instructions are outputted to the button control unit 73, while start reproduction instructions, stop reproduction instructions, chapter search instructions, time search instructions, chapter program instructions, and title program instructions are outputted to the reproduction control unit 72.

The button control unit 73 stores the management information pack of the VOB which is being reproduced which it receives from the AV decoder unit 85, and, when a button selection instruction and a button confirmation instruction are received from the remote controller input interpreting unit 71, outputs a control signal to the AV decoder unit 85 for changing the color of the sub-picture in a screen area assigned to the button to the confirmation color in accordance with the Highlight information in the PCI packet of the stored management information pack. Also, when a button confirmation instruction is received, is sends the command assigned to the selected button to the command interpreting/executing unit 74.

The command interpreting/executing unit 74 interprets the command inputted from the button control unit 73 and, if there is a change of PGC information which changes the reproduction route, the command interpreting/executing unit 74 outputs a reproduction control instruction notifying reproduction control unit 72 of the new PGC information, as well as outputting a system state control instruction notifying the system state management unit when there has been a change to the state parameters stored inside the system.

The valid function determining unit 760 is made up of a route information flag storage unit 761, a route information flag storage unit 762, and a permitted function table 763.

The route information flag storage unit 761 stores the "sequential single PGC identification" flag.

The route information flag storage unit 762 stores the "no branch" flag and the "no branch between titles" flag.

The permitted function table 763 stores the necessary combinations of the set states of the flags in the route information flag storage unit 761 and the route information flag storage unit 762 for each of a chapter number display function, a reproduction time display function, a chapter number search function, a time search function, a chapter programming function, and a title programming function to be permitted. An example of this permitted function table is shown in FIG. 20. As shown in this figure, the chapter number display function, the reproduction time display function, the chapter number search function, the time search function, and the chapter programming function are only permitted when both the "sequential single PGC identification" flag and the "no branch" flag are "On". In the same way, the title programming function is only permitted when the "sequential single PGC identification" flag and the "no branch between titles" flag are "On".

The system state management unit 750 includes a group of state registers 751 which is made up of all kinds of registers showing the present state of the disc reproduction apparatus, a video manager buffer 752 into which the Video Manager is loaded, and a PGC information buffer 753 into which the PGC information which is presently being used is loaded. Here, the group of state registers 751 is made up of an audio channel register, a sub-picture register, a PGC number register, a program number register, an index number register, a chapter number register, and a reproduction elapsed time register.

The audio channel register is used to store the audio channel number which is presently valid, with the sub-picture channel register storing the sub-picture channel number which is presently valid, with these numbers being outputted as a control signal to the AV decoder unit 85 to indicate the present audio channel and sub-picture channel. When reproduction is commenced by the reproduction control unit 72, the title number of the title being reproduced is stored in the title number register. At the same time, the number of the Entry-PGC information for the chosen title is stored in the PGC number register. Here also, when the reproduction of VOBs n the reproduction order indicated by the PGC information determined by the reproduction control unit 72, the program number of the classification number of the VOB which is presently being reproduced is stored in the program number register.

The chapter number register is used to store the chapter number, while the reproduction elapsed time register is used to store the elapsed reproduction time. The title number register stores the title number. While reproduction is being performed, the values stored by these registers are updated as is required. When such updating is performed, a control signal showing the updated value is outputted to the state display unit 209.

FIGS. 21A–21D and 22A–22D are flowcharts for the processing of the system control unit 93. The operation of DVD player will be explained below with reference to these figures.

When the user presses the eject button on DVD player 1, the platter is moved outside of the cover. When a user places an optical disc on this platter, the platter is then moved back into the DVD player 1 to load the disc. As shown in step S121 of FIG. 21A, the system control unit 93 is first waits for a disc to be inserted, and, on detecting that a disc has been loaded using an optical sensor or the like, controls the mechanism control unit 83 and the signal processing unit 84 to perform rotation control with the optical pickup is positioned in the lead-in region. This operation continues until stabilized rotation has been achieved, at which point the optical pickup is moved outward from the lead-in region and reads the volume management area. Based on the information in this volume management area, the video manager is written into the video manager buffer 752 (step S122). The system control unit 93 also calculates the storage address of the PGC information for the volume menu, and writes the PGC information into the PGC information buffer (step S123). Since this PGC information is for the volume menu, it is stored in the buffer, so that the system control unit 93 can refer to its content and calculate the storage address of the VOBs to be reproduced for the menu. Once the VOB to be reproduced is decided, the system control unit 93 outputs a control signal to the mechanism control unit 83 and to the signal control unit 84 and has the determined VOBs read from the optical disc. As a result, a volume menu, such as that shown in FIG. 12, is displayed on the TV monitor 2 (step S124). When this volume menu is displayed, the reproduction control unit 72 waits for the selection of a title number (step S125).

Here, the user views the list of titles and confirms a selection of his/her desired title number. The state display unit 209 is then made to display the selected title number (step S126), and the Highlight command, "PlayTitle", which is stored corresponding to the selected title number is read. Following this, in step S127 the VTS number #i and the VTS internal title number #j are read from the title search pointer #k corresponding to the title number #k indicated by the operands of the "PlayTitle" command. In step S128, the title playback type #k is read from the title search pointer #k corresponding to the selected title number #k. In step S129, it is judged whether the "sequential single PGC identification" flag is "On", and in step S130 it is judged whether the "no branch" flag is "On". These judgments are to confirm that title #k is a single sequential title, so that if either of the flags is "Off", a "No" judgment will be given and the processing will advance to step S135, where a "Chapter display and time display not possible" message is displayed together with the title number. In this case, in step S132, the state display unit 209 is deactivated and the processing advances to step S133. Note here that the display in step S135 is merely a display of information to the user, so that this step may be omitted.

When both of the flags are judged as being "On" in steps S129 and S130, the processing advances to step S131 where the time display of the state display unit 209 is reset to "00:00:00" and the chapter display is reset to "00", with the processing then advancing to step S133. In step S133, the title number #j and the number of the Entry-PGC information number are read from the title search pointer of the video title set indicated by the VTS number #i and are written into the group of state registers 751. The route processing routine is then called in step S134 with the PGC information #k read in this way as the Entry-PGC information.

Figure 21A:
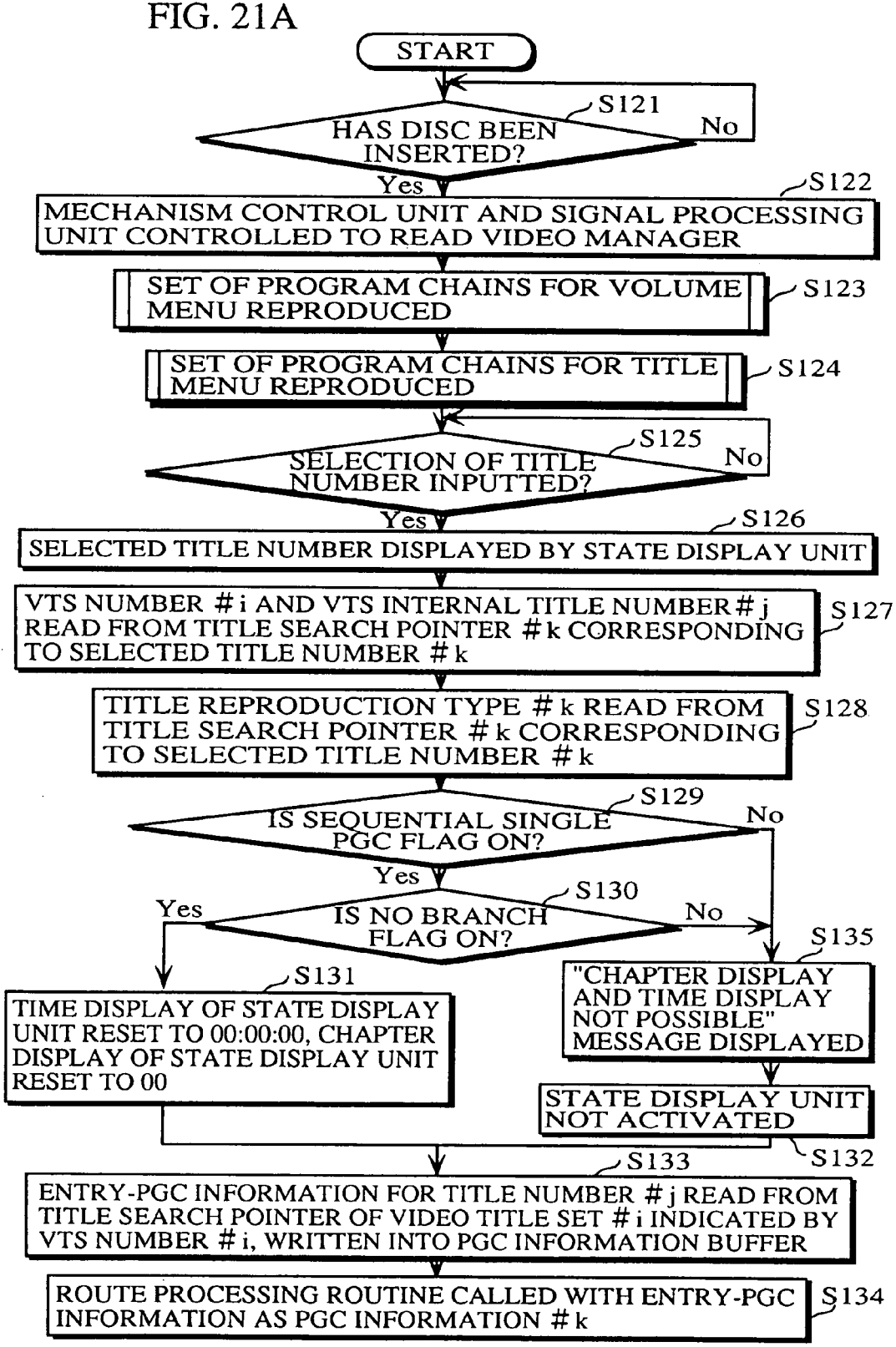
FIGS. 21A to 21D are flowcharts for the processing of the system control unit 93.
Figure 21B:
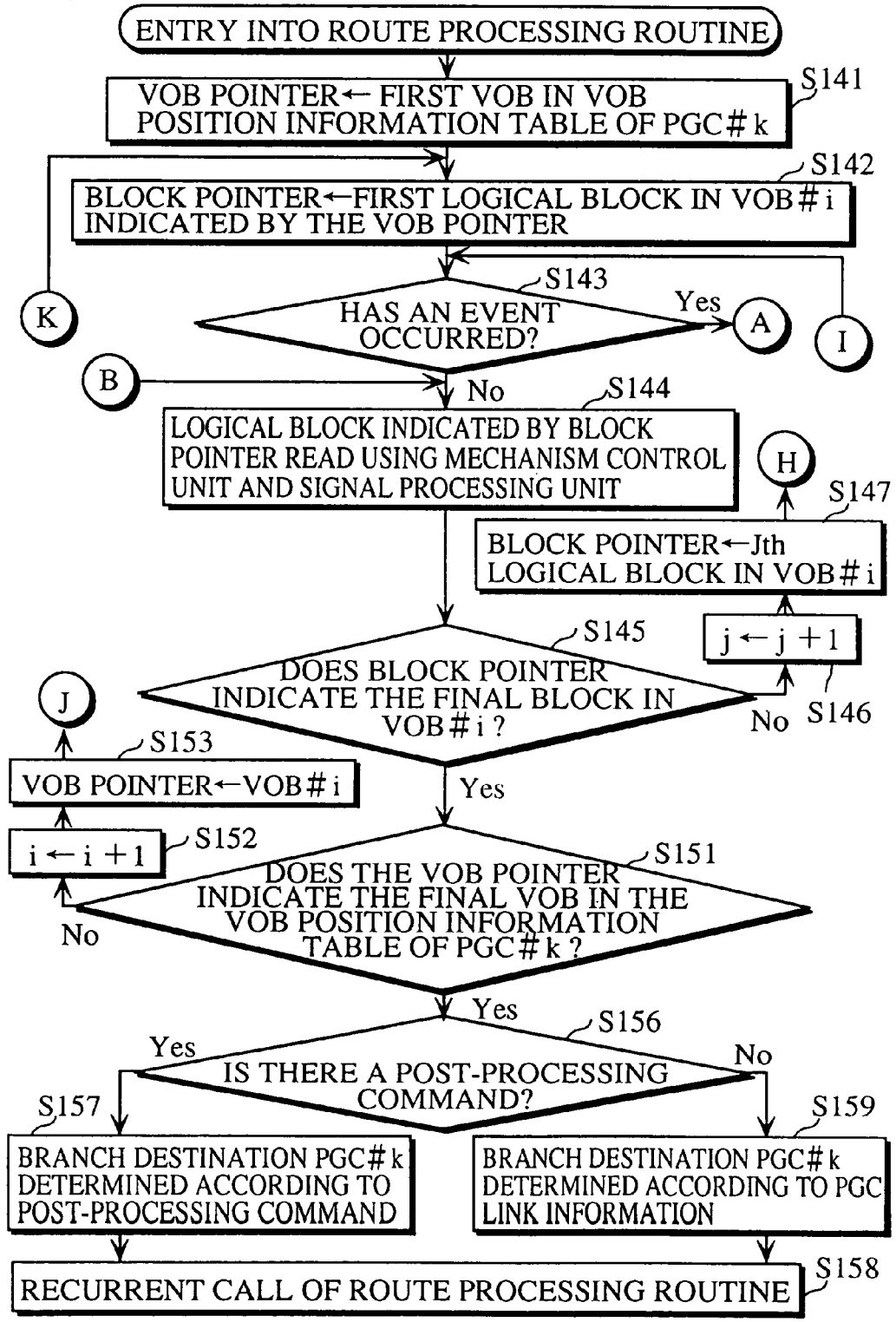

FIG. 21B is the flowchart for the route processing routine. In this figure, the "VOB pointer" indicates the VOB to be read out of the VOB position information in the PGC information stored in the PGC information buffer 753, while the "block pointer" indicates the logical block which is presently being read in the VOB indicated by the VOB pointer. In step S141, the VOB pointer is initialized, which is to say set to the first VOB in the VOB position information table of the PGC information #k. In step S142, the block pointer is initialized, which is to say set at the first logical block in VOB#i indicated by the VOB pointer. Next, in step S143, a check is performed to see whether an event has been caused by a user operation, and if not, in step S144, the mechanism control unit and the signal processing unit are activated to read the logical block indicated by the block pointer. Here, since each VOB is made up of a plurality of VOB units which each have a management information pack at the front, a management information pack is read first by the signal processing unit 84. The signal processing unit subjects the signal read by the optical pickup to the variety of processes described above, and the processed data is stored in logical block units in the buffer memory inside the system control unit 93. The signal separating unit 86 receives the packs transmitted from the buffer memory and refers to the stream ID and substream ID in the header of each pack to detect whether each pack is a management information pack. Here, detected management information packs are outputted to the system control unit 93.

The reproduction control unit 72 sets the transfer rate and buffer size included in each management information pack and prepares for the decoding of the video pack, audio pack, and sub-picture pack which follow the management information pack in question.

Next, in step S145, the reproduction control unit 72 judges whether the block pointer is indicating the final logical block in VOB#i, and if not, the processing advances to step S146 where the variable j is incremented by one and to step S147 where the block pointer is updated to the jth logical block in VOB#i. After this, the processing advances to step S148 in FIG. 21C.

Figure 21C:
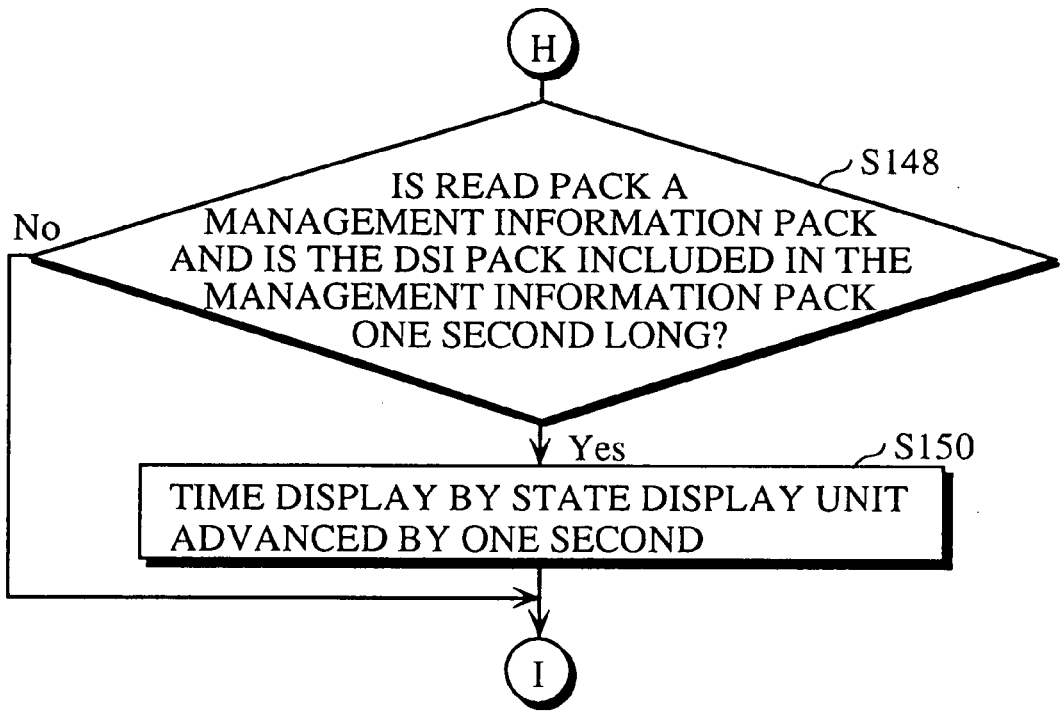
Figure 21D:
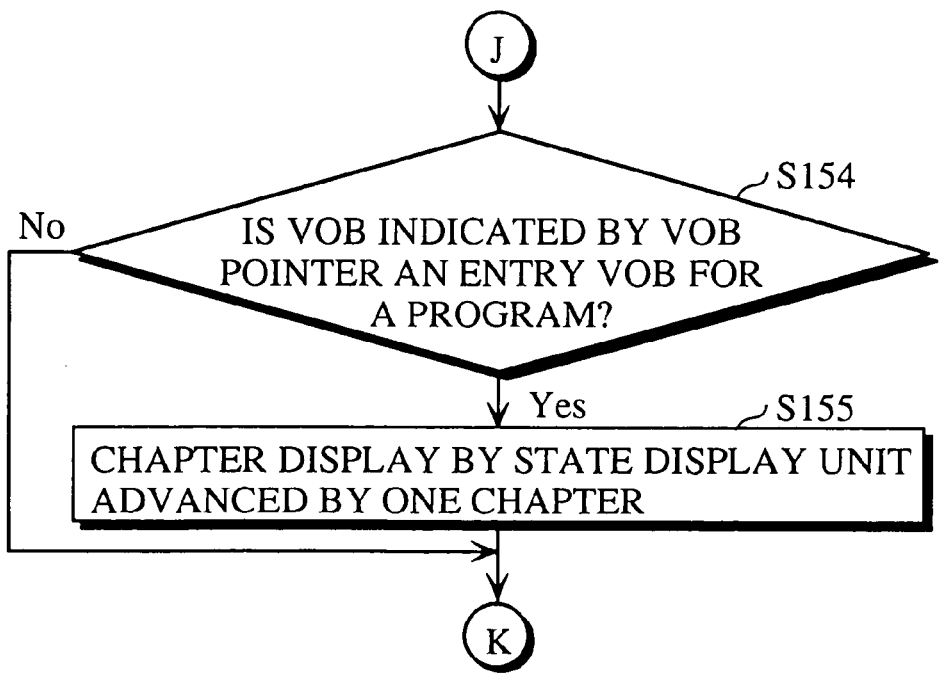
Figure 22A:
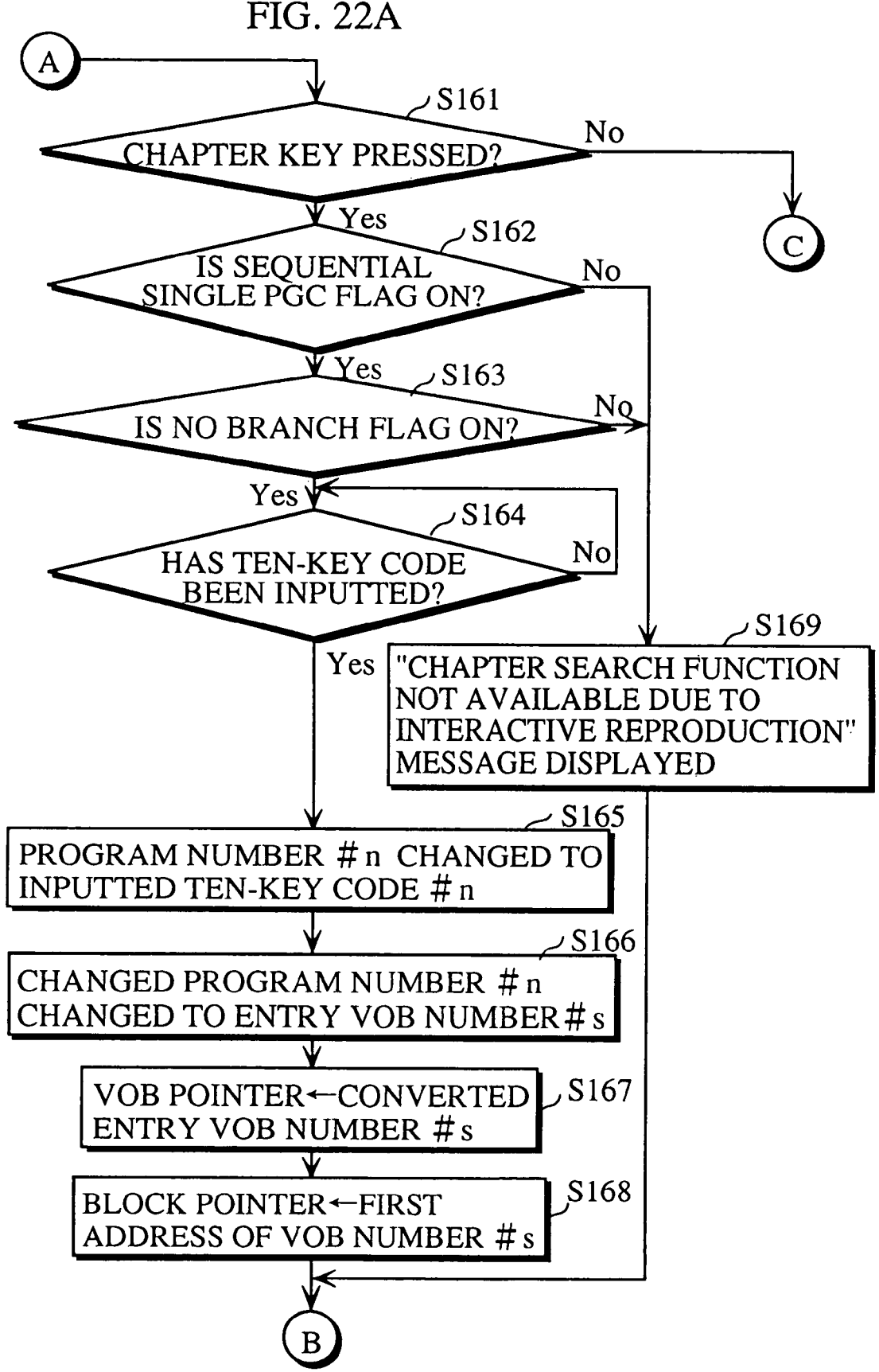
FIGS. 22A to 22D are flowcharts for the processing of the remote controller processing routine of the system control unit 93.
Figure 22B:
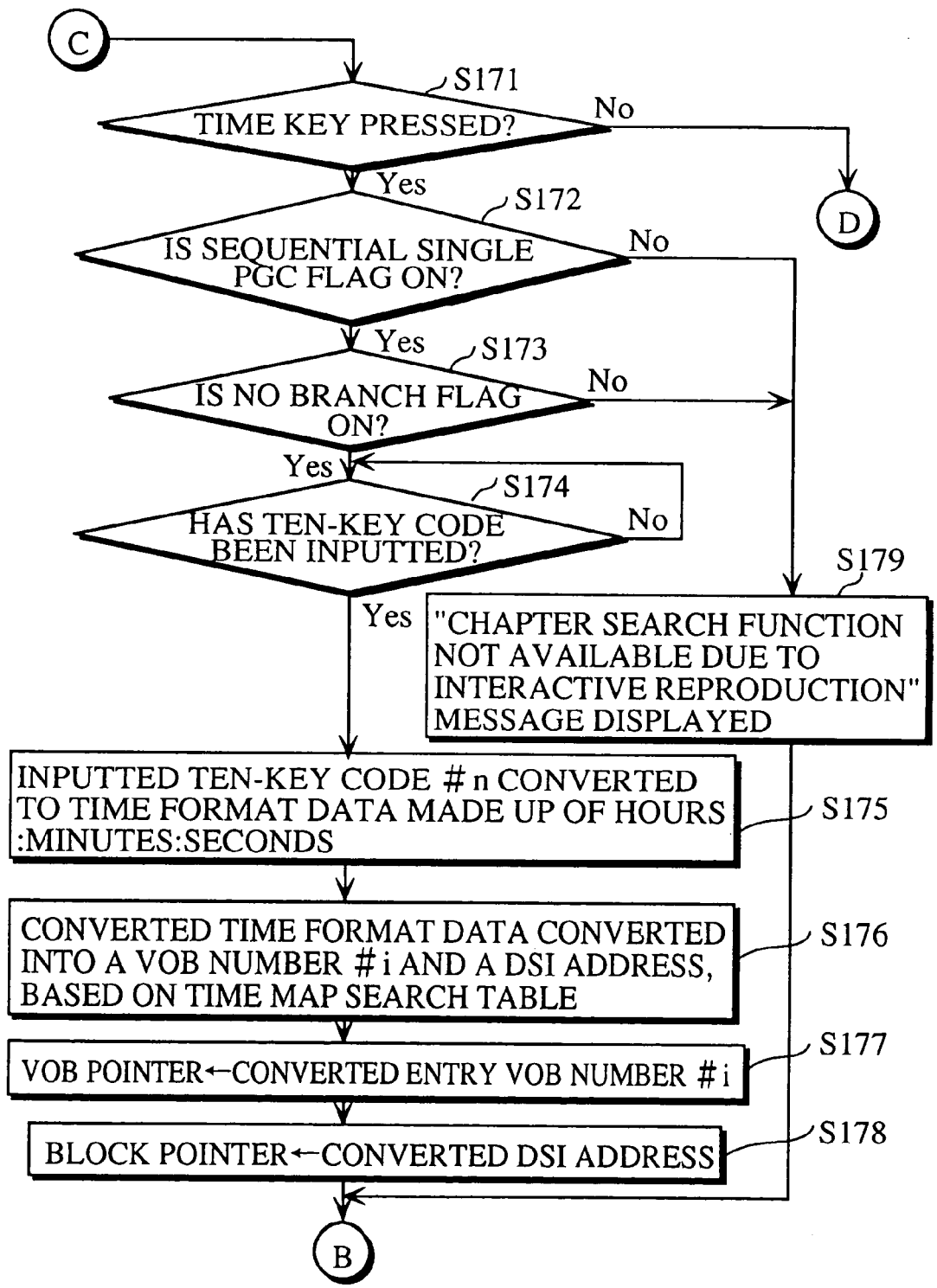
Figure 22C:
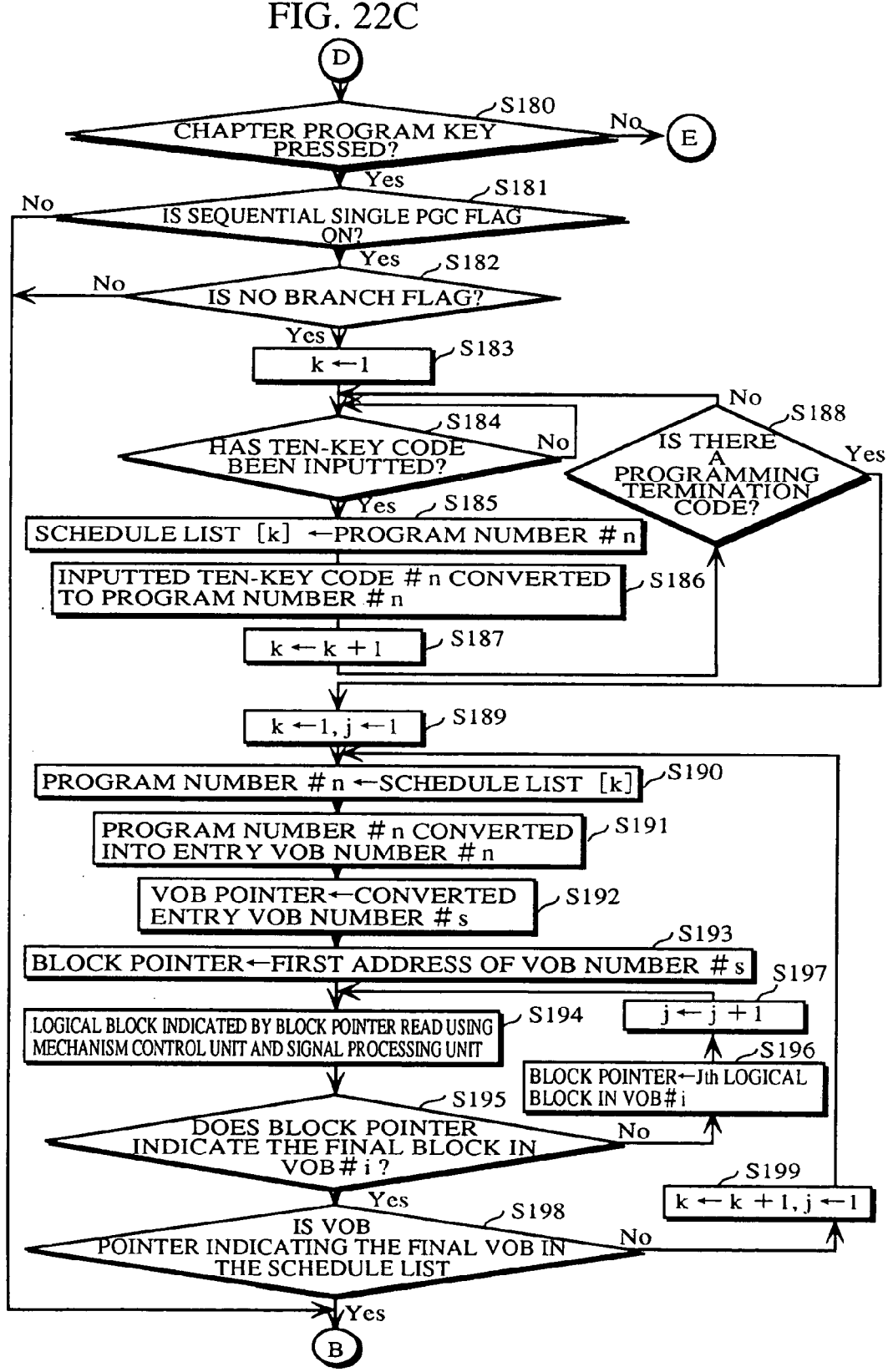
Figure 22D:
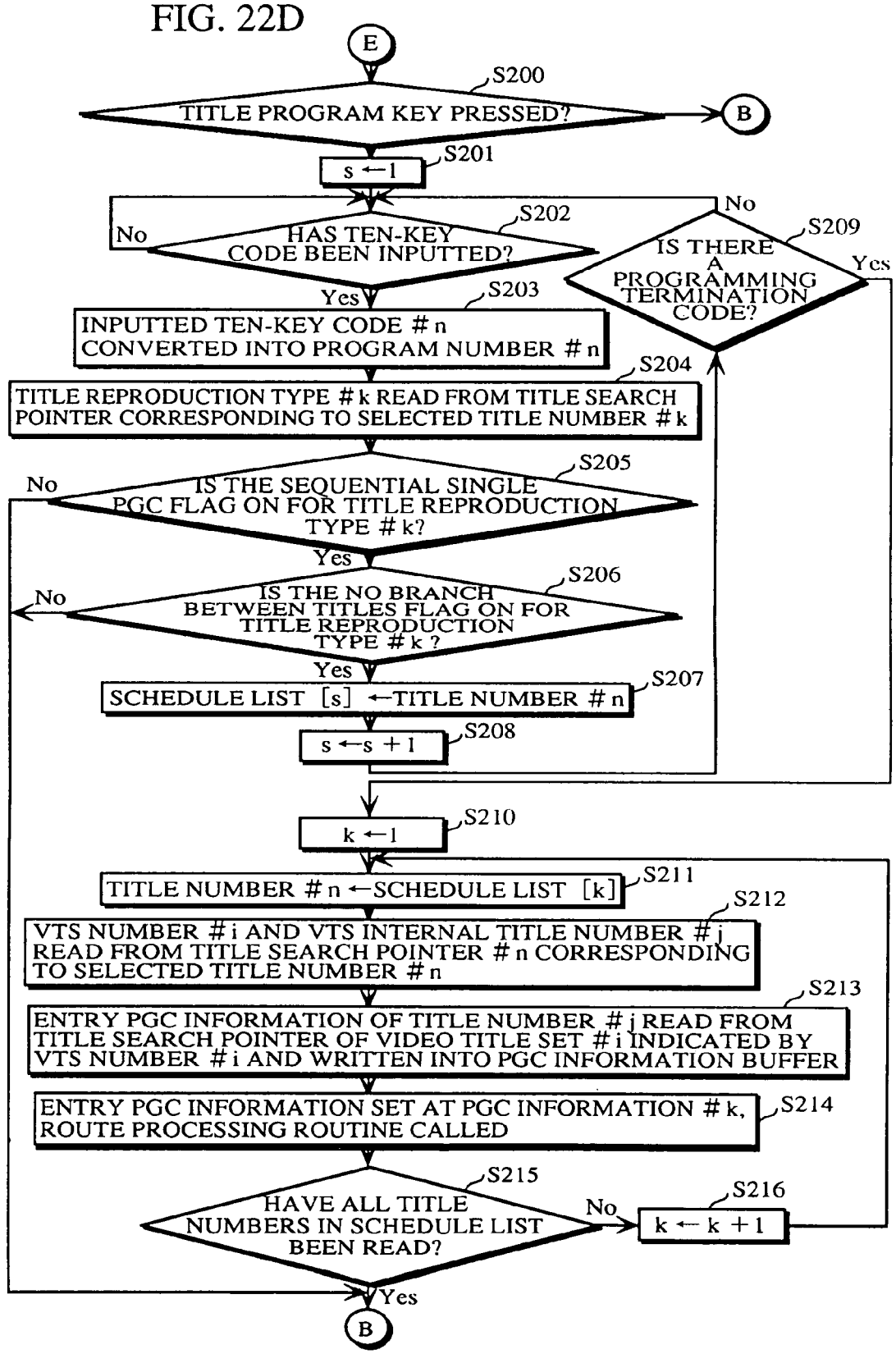

In step S148 in FIG. 21C, a judgment as to whether the pack read according to the indication of the block pointer is a management information pack and whether the DSI packet included in this management information pack is one second long. This is performed since it is necessary to update the time display on the state display unit 209 in synchronization with the reading of management information packs which are provided at the front of 0.5 second-long VOB units. Here, if the reading of a VOB has just begun, the display of the state display unit 209 will not be updated, while when the reading has progressed and a DSI packet which is one second long has been read, the time display of the state display unit will be advanced by one second.

By repeating the processes in steps S143 to S147 the time display can be updated, with the video, audio, and sub-picture packs which compose the VOB being successively read. The signal read from the disc is processed by the signal processing unit 84 and is stored in logical block units in the buffer memory of the system control unit 93. Packs are then transmitted from the buffer memory to the signal separating unit 86 and the stream ID and substream ID in the header of each pack is judged.

For video packs, the MPEG decoder 120 judges whether the stream ID is "1110 0000" and outputs the packs to the video decoder 87. The video decoder 87 decodes the packs according to MPEG methods and having waited an appropriate time according to the SCR and PTS, outputs the decoded image signal to the picture mixing unit 90.

For sub-picture packs, the MPEG decoder 120 judges whether the stream ID is "1011 1101" and whether the first three bits of the substream ID are "001", and outputs the packs to the sub-picture decoder 88. The sub-picture decoder 88 decodes the packs according to run-length decoding and having waited an appropriate time according to the SCR and PTS, outputs the decoded image signal to the picture mixing unit 90.

The outputs of the video decoder 87 and the sub-picture decoder 88 are mixed by the picture mixing unit 90 according to the mixing ratio specified by the system control unit 93. This mixed image signal is then converted to an analog signal and is outputted to the TV monitor 2.

As a result of the repetition of the above process, the block pointer ends up indicating the final logical block in the current VOB, so that the judgment "Yes" is given in step S145 and the processing advances to step S151. In step S151, it is determined whether the VOB pointer is indicating the final VOB in the VOB position information table for PGC information #k, and if not, the processing advances to step S152 where the variable i is incremented, and then to step S153 where the VOB position information is advanced to the next VOB in the VOB position information in PGC information #k. Following this, the processing moves to step S154 in FIG. 21D.

It should be noted here that when the VOB pointer is advanced to the next VOB, there is the possibility that the VOB newly indicated by the VOB pointer is the Entry-VOB for a program. A judgment to see whether this is the case is performed by the reproduction control unit 72 in step S154, with the judgment "Yes" resulting in the processing advancing to step S155 in FIG. 21D, where the chapter display by the state display unit 209 is advanced by one before the processing returns to step S142. Following this, the processing in steps S142–S147 is performed for the newly indicated VOB.

When it is judged in step S151 that the VOB pointer is indicating the final VOB in the VOB position information, this means that the present reproduction route has been completed. At this point, a check is performed to see if there is a post-processing command in the PGC information stored in the PGC information buffer 753. If there is, the branch destination PGC information #k is determined according to this post-processing command, or if not, the branch destination PGC information #k is determined according to the PGC link information, before the route processing routine is recurrently called in step S158.

Processing of Reproduction Control Unit 72 for a Chapter Search

The following explanation deals with the case when the user makes a chapter search operation while reproduction is being performed as described above. In this case, the judgment "Yes" is given in step S143 and the processing advances to step S161 in FIG. 22A. In step S161, a judgment is made as to whether the chapter search key was pressed, in which case the processing advances to step S162. In steps S162, S163, judgments are made to see whether the "sequential single PGC identification" flag and the "no branch" flag are "On", and, if either of these flags is "Off", the processing advances to step S169 where the message "Chapter search function not available due to interactive reproduction" is displayed, before returning to step S144. As mentioned before, such display is not essential to the operation, and so may be omitted.

When both flags are "On", in step S164 the system waits for an input from the ten key 911. If the user presses the "8" key on the remote controller 91, the result "Yes" is given in step S164, and, in step S165, the inputted ten key code "8" is converted in program number "8". This program number "8" is then converted into an Entry VOB number #s, and in step S167 the converted Entry VOB number #s is set in the VOB pointer. In step S168, the first address in the Entry VOB number #s is set in the block pointer. After the pointers have been set in this way, the processing returns to step S144, where the indicated logical block is read by the mechanism control unit and signal processing unit as before.

Processing of Reproduction Control Unit 72 for a Time Search

The following explanation deals with the case when the user makes a time search operation while reproduction is being performed as described above. In this case, the judgment "Yes" is given in step S143 and the processing advances to step S161 in FIG. 22A. In step S161, a judgment is made as to whether the chapter search key was pressed, which is not the case, so that the processing advances to step S171. In step S171, a judgment is made as to whether the time search key has been pressed, and, since this is the case, the processing advances to step S172. In steps S172, S173, judgments are made to see whether the "sequential single PGC identification" flag and the "no branch" flag are "On", and, if either of these flags is "Off", the processing advances to step S179 where the message "Time search function not available due to interactive reproduction" is displayed, before returning to step S144. As mentioned before, such display is not essential to the operation, and so may be omitted.

When both flags are "On", in step S174 the system waits for an input from the ten key 911. In step S175, the inputted ten key code is then converted to time format data written as hr:min:sec. After this conversion, the reproduction search unit 72 in step S176 converts the time format data into a VOB number #i and a DSI packet, based on the time map search table. In step S177, the converted VOB number #i is set in the VOB pointer and in step S178, the converted DSI address is set in the block pointer. By setting the pointers in this way, reproduction can be commenced from the reproduction time indicated by the user.

Processing of the Reproduction Control Unit 72 for the Chapter Programming Function The following is an explanation of when a user makes a chapter programming function operation during the reproduction of VOBs using the remote controller 91. When such an operation is received by the remote control receiving unit 92, the judgment "Yes" is made in step S143 of FIG. 21B and the processing advances to step S161. In step S161, the judgment as to whether the chapter key has been pressed results in "No", so that the processing advances to S171. In step S171, the time key has not been pressed, so that the judgment "No" is given and the processing advances to step S180. In step S180, the judgment "Yes" is given, so that in steps S181 and S182, the system confirms that the "sequential single PGC identification" flag and the "no branch" flag are both "On".

Here, if both flags are "On", the processing advances to step S183 where the variable k is set at "1", before the input of a ten key code is made in step S184. Here, the variable k is used to express a value to be added to the plurality of programs which have been confirmed in the schedule list, while the schedule list refers to a list of the programs to be reproduced by the chapter programming function.

Once a key code has been inputted, the judgment "Yes" is given in step S184 and the processing advances to step S185.

In step S185, the inputted ten key code #n is converted to a program number #n and in step S186 this program number #n is stored as the kth item in the schedule list. After this, the variable k is incremented by one in step S186 and it is judged in step S188 whether a programming termination code has been issued by the remote controller 91. Here, a programming termination code is a code to terminate numerical input, so that as long as no such code is detected in step S188, the processing in steps S184 to S188 will be repeated. By doing so the first, second, third, and later program numbers are stored in the schedule list. If, having entered the program numbers "1", "3", "5", and "7", the user makes a programming termination operation, the judgment "Yes" will be given in step S188 and the processing will advance to step S189. Steps S189 to S199 are made up of a loop process in which VOBs are read in accordance with the schedule list. In step S189, the variable k and the variable #s showing the block pointer are reset to "1", and in step S190, the first program number #n in the schedule list is converted to an Entry-VOB number #s. Next, this Entry-VOB number #s is set in the VOB pointer and the first address in this Entry-VOB number #s is set in the block pointer, before the logical blocks in this VOB are read by the mechanism control unit and the signal processing unit.

For the above example, the first program number "1" in the schedule list is converted into a Entry-VOB number #s which is set in the VOB pointer. The first address in this Entry-VOB number #s is set in the block pointer, and the logical blocks in this VOB are read by the mechanism control unit and the signal processing unit. When the final logical block is indicated by the block pointer, the judgment "Yes" is given in step S195 and the processing advances to step S198.

In step S198, it is confirmed that the final VOB of the schedule list is being indicated, and if not, in step S199 the variable k is incremented to indicate a next program number in the schedule list, before the processing returns to step S190.

After this, the processing in steps S190 to S197 is repeated for all of the remaining program numbers in the schedule list.

Processing of the Reproduction Control Unit 72 for the Chapter Programming Function The following is an explanation of when a user makes a title programming function operation during the reproduction of VOBs using the remote controller 91. When such an operation is received by the remote control receiving unit 92, the judgment "Yes" is made in step S143 of FIG. 21B and the processing advances to step S161. In step S161, the judgment as to whether the chapter key has been pressed results in "No", so that the processing advances to S171. In step S171, the time key has not been pressed, so that the judgment "No" is given and the processing advances to step S180. In step S180, the chapter programming key has not been pressed, so that the judgment "No" is given, and the processing advances to step S200. In step S200, the title programming key has been pressed, so that the judgment "Yes" is given in step 200 and the processing advances to step S201, where the variable s is reset to "1". This variable s is used to express the order of the plurality of titles which are to be reproduced in the schedule list. This schedule list is a list of the titles which are to be reproduced in the specified order. In step S202, the system waits for a input from the ten key.

Once there has been an input from the ten key, the inputted ten key code #n is converted into a title number #k, and the title playback type #k is read from the title search pointer #k corresponding to this title number #k. Following this, it is judged whether the "sequential single PGC identification" flag is "On" for the reproduction type #k. If this flag is "On" in step S206, the title number #n inputted using the ten key is set as the first item in the schedule list. Following this, the variable s is incremented in step S208 and in step S209, a check is performed to see whether the programming termination code has been inputted, with the processing in steps S202-S209 being repeated until such code is inputted. At such time, the variable k is reset to "1" in step S210, and the first title number #n in the schedule list is read in step S211. In step S212, the VTS number #i and the VTS internal title number #j are read from the title search pointer #n corresponding to the selected title number #n, and in step S213, the title number #j and the Entry-PGC information are read from the title search pointer of the video title set #i indicated by the VTS number #i and are written into the group of state registers 751. After this, the route processing routine is called with the Entry-PGC information as the PGC information #k.

By calling the route processing routine in this way, the processing in the route processing routine can be performed for the Entry-PGC information for the first title number in the schedule list, before a return is performed to the present flowchart. A judgment is then made as to all of the title numbers in the schedule list have been read, and if not, the variable k is incremented to have the next title number read.

With the disc reproduction apparatus of the present embodiment, an immediate judgment can be made during reproduction execution of an application as to whether emulated AV functions, such as feedback functions including display of a present chapter number and present reproduction time, search functions based on chapter number or reproduction time, a programmed reproduction function using chapter numbers, or a programmed reproduction function using titles, are possible and when not possible, the system can prohibit the function to prevent erroneous operation.

For the present embodiment, the display of reproduction elapsed time and chapter number during disc reproduction can be linked to titles, so that only valid numbers are displayed. This is to say, display of reproduction time and chapter numbers is only performed where appropriate, so that no display is given for unsuitable titles. In this way, the system does not end up displaying invalid information to the user.

The present embodiment has described the construction and operation of a low-cost player although it should be obvious that a variety of other types of player, such as professional machines, are also possible, provided that all types of players can detect the differences between species (1) to (5). As described above, low-cost players, which are ideal for home or portable use, have small memories and low processing speeds. Professional machines, however, may be used as network servers, have extremely large memories and high processing speeds.

Here, there may be differences between players as to the titles for which emulated AV functions may be used. While low-cost players may only perform AV functions for species (1), professional players may perform emulated AV functions for species (1), (4), and (5).

In the above case, the title search pointer table is composed as shown in FIG. 23. This table includes a first flag showing whether there is only one set of route information, a second flag showing whether there is any loop information, a third flag showing whether there is any automatic branch information, and a fourth flag showing whether there is any interactive branch information. Here, species (1)–(6) can be identified by using these flags to detect the presence of loop information, automatic branches, and interactive branches. Title playback types are originally formed in this way, although in the present embodiment the "sequential single PGC identification" flag shows whether there is only one set of route information, and the other flags show whether there is any loop information, so that the title playback types are expressed in a format suited to AV devices.

It is also possible for a flag showing the presence of a certain kind of command (such as commands related to control of a timer) to be provided in the title playback table. The presence of commands which relate to control of a timer makes special kinds of time control possible for the title in question. Such control, however, make a display of reproduction time inappropriate, so that a flag showing its presence needs to be provided.

The permitted function determination table should not be construed as being limited to a determination of whether a function is possible base on a combination of the functional and structural characteristics of the route information of the title. For example, when a multi-PGC flag and a "no branch" flag are provided, the determination of whether execution is permitted for the time search function and the reproduction time display function can be made when these flags are "On", with the functions being allowed for routes which are made up of a plurality of PGCs but which are sequential with no branches.

The present embodiment also describes the case where the condition for the setting of the automatic branch flag at "On" is the presence of a branch command for an automatically-performed branch in the PGC command field forming the title, although it may also be set when an automatically executed command is present in a PGC. As one example, a default execution for when there is no user interaction can be set as a button attribute in the Highlight information stored in a VOB, so that the presence of buttons which have default execution attributes can be used as the condition that branch instructions are present.

In the present embodiment, the condition for the setting of the "no branch between PGCs" flag at "On" was described as being a complete lack of branch information between titles, although if instructions for buttons which are executed due to user interaction are present, this flag may still be set at "On". In this case, titles which include manual branches to other titles will still have the "no branch between PGCs" flag set at "On", so that if the "sequential single PGC identification" flag is "On", the title programming function may still be performed for this title. However, once such a manual branch is performed during reproduction, this will result in the reproduction order in the schedule list no longer being valid, so that the reproduction apparatus needs to perform the invalidation of the remaining title programs in the schedule list.

The following is another example of the stored content of a multi-title disc. In this example, five episodes of a popular drama series are stored on the disc, as video titles (1) to (5), with a multi-story interactive title which uses the video information of titles (1) to (5) being stored as video title (6). In this case, image titles (1) to (5) are all sequential single PGC types, so that successive reproduction of (1) to (5) is possible using the title programming function. In this case, the "no branch between titles" flag in the VM internal title search pointer table area is "Off", so that these titles can be reproduced successively in order.

The VOB position information table of the present invention has been described as a list of storage locations for VOBs, based on which the disc reproduction apparatus reads VOBs, although by storing partial areas of the storage locations of the VOBs in this table, the optical pickup can be made to read only part of the VOBs, such partial reading being known as "trimming". These trimmed parts of VOBs are indicated in units called cells. By doing so, by indicating partial areas in the VOB position information, only part of a VOB is used as a core part, so that the efficiency with which video materials are used can be increased.

In the present embodiment, a VOB unit consists of one GOP. It is needless to say that if the stored video information has a reproduction time of about a second, a VOB unit may consist of two or three GOPs with a very short reproduction time. In this case, a management information pack is set before such a plurality of consecutive GOPs. The management information pack is then effective for such plurality of GOPs.

In the present embodiment, digital moving picture data according to MPEG2 standard is used for the moving picture data. However, other kinds of moving picture data, such as the digital moving picture data under MPEG1 or digital moving picture data with a conversion algorithm other than DCT (Discrete Cosine Transform) under MPEG, may be used so long as the moving picture data can be combined with audio data and sub-picture data to form multimedia data.

In the present embodiment, management information packs are included in VOBUs in units of GOPs, these being the units of reproducing moving picture data. However, it should be obvious that if the method for compressing digital moving pictures changes, the unit of the management information pack changes according to the compression method.

Finally, a method for producing the optical disc used in the present embodiment is described. The editor prepares master tapes, such as video tapes of various shots filmed with video cameras and music tapes in which songs and sounds are recorded live. The moving pictures and sounds in the tapes are digitized and loaded into a nonlinear editing machine. The editor creates menus and items using application programs, such as a graphic editor provided in an editing machine, and reproduces video and sounds frame by frame. The editor also creates management information packs including Highlight commands using a GUI generator and the like. The editor then encodes the above data under MPEG to create video data, audio data, sub-picture data, and management information packs. After this, the editor creates VOB units and VOBs using the nonlinear editing machine. The editor also assigns numbers to the VOBs. Also, the editor creates PGC information #1, #2, #3, . . . , #n, a VM title search pointer table, and a video manager. The editor then loads these sets of data into the memory of a workstation.

The data is converted into logical data sequences so that the data is recorded in the file area. The logical data sequences are recorded onto a medium, such as the magnetic tape, then converted to physical data sequences. The physical data sequences include volume data with ECC (Error Check Code), Eight-to-Sixteen conversion, and data in the lead-in area and lead-out area. A master optical disc is produced using the physical data sequences. Then, copies of the master optical disc are manufactured by using a pressing machine.

Conventional CD manufacturing machines may be used for manufacturing the above-constructed optical disc with the exception of the processes related to the generation of logical data sequences for the data construction of the present invention. These manufacturing methods are described in Heitaro Nakajima and Hiroji Ogawa: "Compact Disc Dokuhon", Ohmu Ltd. and Applied Physics Society Optics Meeting: Optical Disc System, Asakura Shoten.

Commercial Applications

The optical disc of the present invention can be used for storing both sequential video titles and interactive video titles, and so allows the distribution and retailing of optical titles which are on a multi-title disc.

The reproduction apparatus and method of the present invention allow the reproduction of the above disc by household AV equipment with limited memory capacity.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A disc reproduction apparatus and optical disc system, the optical disc comprising:
    a title area with a plurality of video titles and a manager area, each video title includes route information and a plurality of pieces of video information retrieved according to the route information, die manager area includes an address management information for storing plurality of pieces of address management information, each of which includes an address of one of the plurality of video titles; and
    reproduction information for indicating a status of each of the video titles relative to enabling a variable sequence of reproduction by the disc reproduction apparatus; and
    the disc reproduction apparatus comprising:
    an optical disc pickup for optically reading data from the optical disc;
    a drive mechanism for driving the optical pickup;
    first controlling means for controlling the drive mechanism to have the optical pickup read data from the manager area;
    a manager buffer for storing the data read by the first controlling means;
    receiving means for receiving a video title selected by an operator to be reproduced;
    calculating means for calculating an address of the video title selected by the operator by referring to the manager buffer;
    second controlling means for controlling the drive mechanism to move the optical pickup and to have the video title read from a position specified by the address calculated by the calculating means;
    judging means for judging whether a variable sequence of reproduction can be executed in the video title read by the second controlling means by referring to the reproduction information corresponding to the video title; and
    a user executing means for executing a user selected variable reproduction sequence of the pieces of video information only when the judging means judges that such a user selection can be used in the video title.

2. An optical disc having video data to be read and reproduced by an audio-visual device in accordance with a reproductive order indicated by route information, the optical disc comprising:

a plurality of pieces of video information;

route information, to be read by said audio-visual device, defining a reproduction route by specifying at least one reproductive order of the plurality of pieces of video information;

a plurality of title search pointers that correlate a plurality of title numbers, which are uniquely assigned to a plurality of titles, with a piece of entry route information; and disc reproduction information including branch status information for each title wherein each title is either (1) reproduced in accordance with only the piece of entry route information or (2) reproduced in accordance with a plurality of pieces of route information including only the piece of entry route information, and the branch status information indicates whether or not a branch between pieces of route information occurs during reproduction of each title.

3. The optical disc of claim 2, wherein the plurality of pieces of information include:

commend regions storing commands;

the commands stored in the command regions from part of the route information;

the commands include a command that shows at least one piece of image information that is allowed to branch during reproduction; and the disc reproduction information indicates that a reproduction route defined by the route information is a non-branch type if no commands that indicate pieces of image information that are allowed to branch no stored in the command regions.

4. The optical disc of claim 2, including:

a control region for storing linking information and commands separately to the plurality of pieces of image information;

the linking information being past of the route information and showing a piece of image information that is reproduced after each piece of image information;

the commands being part of the route information controlling reproduction of the plurality of pieces of image information;

including pieces of image information that are allowed to branch irrespective of pieces of image information shown by the linking information; and the disc reproduction information indicates that a reproduction route defined by the route information in a non-branch type if no commands that indicate pieces of image information that are allowed to breach are stored in the command regions.

5. The optical disc of claim 2, wherein each piece of information includes:

a series of video objects;

the route information include;

at least one piece of program chain (PGC) information that shows a reproduction order for certain video objects;

position information showing positions on the optical disc of the video objects shown by each piece of PGC information;

PGC linking information showing how pieces of PGC information are linked together;

a command table showing three pieces of PGC information that branch during reproduction to other pieces of PGC information that are different from the PGC information provided in the PGC linking information; and the disc reproduction information indicates whether a reproduction route defined by the route information is a first type that is expressed by a single piece of PGC information or a second type that is expressed by a plurality of pieces of PGC information.

6. The optical disc of claim 2, wherein the disc reproduction information is formatted for storage in a disc reproduction device when the optical disc is initially loaded into the disc reproduction device and includes:

menu information for displaying to a user the plurality of titles in a menu format; and indicator information for indicating for each title whether a breach during reproduction is possible.

7. A reproduction apparatus for reproducing the optical disc of claim 2, comprising:

reading means for reading a piece of image information, route information, and disc reproduction information from the optical disc and reproducing the piece of image information;

a controller for controlling the reading means; and a memory for storing available function information showing types of reproduction routes for which execution of certain functions is allowed, based on performance of the reproduction apparatus, wherein the controller:

has the reading means read the image information, the route information, and the disc reproduction information from the optical disc;

has the reading means read and reproduce the image information in accordance with the read route information; and judges, when there is a request to execute one of the certain functions, whether execution of the requested function is allowed, based on the read disc reproduction information and the available function information in the memory.

8. The reproduction apparatus of claim 7 wherein the certain functions include:

a search reproduction function that has reproduction commenced from a specified position within a piece of image information.

9. The reproduction apparatus of claim 7 further comprising:

a feedback means that displays an index number of image information during reproduction of the image information, wherein the certain functions include a feedback function that displays the index number.

10. The disc reproduction apparatus and optical disc system of claim 1 wherein the reproduction information includes one of a fixed order of reproduction and a variable order of reproduction whereby the reproduction unit can immediately determine from the reproduction information whether the sequence of reproduction for a title group can be varied without searching through the entire audio and video information of the title group.

11. The disc reproduction apparatus and optical disc system of claim 10, wherein the fixed order of reproduction can be determined by a combination of flag values including a first flag that indicates the title group can be reproduced from a single piece of route information and a second flag that indicates that route information does not include branch information.

* * * * *

UNITED STATES PATENT AND TRADEMARK OFFICE
CERTIFICATE OF CORRECTION

PATENT NO. : 7,082,257 B2 Page 1 of 1
APPLICATION NO. : 09/932915
DATED : July 25, 2006
INVENTOR(S) : Kazuhiko Yamauchi et al.

It is certified that error appears in the above-identified patent and that said Letters Patent is hereby corrected as shown below:

In the Claims:
Column 36, line 27, "die" should be --the--.
Column 36, line 28, insert --area-- after "information".
Column 36, line 29, insert --a-- before "plurality".
Column 37, line 22, "commend" should be --command--.
Column 37, line 31, "no" should be --are--.
Column 37, line 49, "breach" should be --branch--.
Column 37, line 54, "include;" should be --includes:--.
Column 38, line 13, "breach" should be --branch--.

Signed and Sealed this

Nineteenth Day of December, 2006

JON W. DUDAS
*Director of the United States Patent and Trademark Office*